United States Patent
Lei et al.

(10) Patent No.: US 10,200,169 B2
(45) Date of Patent: Feb. 5, 2019

(54) NARROWBAND WIRELESS COMMUNICATIONS CELL SEARCH

(71) Applicant: QUALCOMM Incorporated, San Diego, CA (US)

(72) Inventors: Jing Lei, San Diego, CA (US); Hao Xu, San Diego, CA (US); Wanshi Chen, San Diego, CA (US); Xiao Feng Wang, San Diego, CA (US); Renqiu Wang, San Diego, CA (US); Yongbin Wei, La Jolla, CA (US); Juan Montojo, San Diego, CA (US); Alberto Rico Alvarino, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 55 days.

(21) Appl. No.: 15/376,025

(22) Filed: Dec. 12, 2016

(65) Prior Publication Data

US 2017/0264406 A1 Sep. 14, 2017

Related U.S. Application Data

(60) Provisional application No. 62/307,419, filed on Mar. 11, 2016.

(51) Int. Cl.
*H04L 5/00* (2006.01)
*H04L 27/26* (2006.01)
(Continued)

(52) U.S. Cl.
CPC .......... *H04L 5/0048* (2013.01); *H04L 5/0053* (2013.01); *H04L 27/2613* (2013.01);
(Continued)

(58) Field of Classification Search
CPC ..... H04L 5/0048; H04L 5/0053; H04L 5/001; H04L 27/2613; H04L 27/2657;
(Continued)

(56) References Cited

U.S. PATENT DOCUMENTS

| 2004/0076246 A1* | 4/2004 | Vanderperren ..... H04L 27/2657 375/343 |
| 2006/0014494 A1* | 1/2006 | Vanderperren ..... H04L 27/2657 455/63.1 |

(Continued)

OTHER PUBLICATIONS

ISA/EP, International Search Report and Written Opinion of the International Searching Authority, Int'l Application No. PCT/US2017/012562, dated Apr. 11, 2017, European Patent Office, Rijswijk, NL, 14 pgs.

(Continued)

*Primary Examiner* — Jenee Holland
(74) *Attorney, Agent, or Firm* — Nerrie M. Zohn

(57) ABSTRACT

Methods, systems, and devices for wireless communication are described. A base station may broadcast a synchronization signal using a narrowband portion of a bandwidth of a cell. The synchronization signal may include a sequence repeated over several symbol periods using a cover code to support power-efficient cell acquisition. A user equipment (UE) receiving the synchronization signal may determine frequency and timing information for a cell by performing a weighted combination and accumulation of low complexity autocorrelation and cross-correlation procedures on the synchronization signal. The reduced complexity correlation procedures may be enabled based on the use of the cover code and a base sequence. In some cases, the cross-correlation may be performed at multiple sampling rates. The use of the cover code within the synchronization signal may also support correlation procedures that use recursive or repeated (Continued)

updates, which may allow for further reduced computational complexity relative to other cell search procedures.

30 Claims, 14 Drawing Sheets

(51) Int. Cl.
H04W 56/00 (2009.01)
H04W 4/70 (2018.01)
H04W 72/04 (2009.01)
H04W 48/16 (2009.01)
H04W 88/02 (2009.01)
H04L 27/00 (2006.01)

(52) U.S. Cl.
CPC ...... H04L 27/2657 (2013.01); H04L 27/2663 (2013.01); H04W 4/70 (2018.02); H04W 48/16 (2013.01); H04W 56/0015 (2013.01); H04W 72/0406 (2013.01); *H04L 5/001* (2013.01); *H04L 27/2671* (2013.01); *H04L 27/2675* (2013.01); *H04L 2027/0026* (2013.01); *H04W 88/02* (2013.01); *Y02D 70/1242* (2018.01); *Y02D 70/1262* (2018.01); *Y02D 70/1264* (2018.01); *Y02D 70/142* (2018.01); *Y02D 70/146* (2018.01); *Y02D 70/21* (2018.01)

(58) Field of Classification Search
CPC ............. H04L 27/2663; H04L 27/2671; H04L 27/2675; H04L 2027/0026; H04W 4/005; H04W 4/70; H04W 48/16; H04W 72/0406; H04W 88/02; H04W 56/0015

See application file for complete search history.

(56) References Cited

U.S. PATENT DOCUMENTS

| | | | | |
|---|---|---|---|---|
| 2006/0171491 | A1* | 8/2006 | Tapaninen | H04B 1/7085 375/343 |
| 2007/0041348 | A1* | 2/2007 | Kwun | H04B 1/70735 370/335 |
| 2012/0099608 | A1* | 4/2012 | You | H04L 27/2656 370/503 |
| 2012/0250742 | A1* | 10/2012 | Tiirola | H04L 25/03343 375/219 |
| 2014/0241447 | A1* | 8/2014 | Reddy | H04L 27/2607 375/260 |
| 2015/0222402 | A1* | 8/2015 | Ouchi | H04L 1/00 370/329 |
| 2017/0223648 | A1* | 8/2017 | Shin | H04W 56/005 |
| 2017/0303220 | A1* | 10/2017 | Sadeghi | H04L 5/0053 |

OTHER PUBLICATIONS

"Title page/ed board", "Theochem," Journal of Molecular Structure, Theory and Components in Chemistry, Nov. 8, 2004, 1 pg., vol. 709, No. 1-3, XP005107942, Elsevier Science Publishers B.V., Amsterdam, NL.

Qualcomm Incorporated, "NB-PSS and NB-SSS Design," 3GPP TSG RAN WG1 Meeting #84, R1-161116, St. Julian's, Malta, Feb. 15-19, 2016, 17 pgs., XP051054416, 3rd Generation Partnership Project.

Qualcomm Incorporated, "WF on Short Sequence Design for PSS," 3GPP TSG RAN WG1 #84, R1-161439, St. Julian's, Malta, Feb. 15-19, 2016, 7 pgs., XP051079360A, 3rd Generation Partnership Project.

* cited by examiner

| 410 { | $R_{n+1}$ | ••• | ••• | ••• | ••• | ••• | ••• | ••• | ••• | ••• | $R_{n+10}$ |
|---|---|---|---|---|---|---|---|---|---|---|---|
| 415 { | 1 | 1 | 1 | 1 | -1 | -1 | 1 | 1 | 1 | -1 | 1 |
| 420 { | A | A | A | A | -A | -A | A | A | A | -A | A |

405 brace spans one column above.

NARROWBAND WIRELESS COMMUNICATIONS CELL SEARCH

CROSS REFERENCES

The present Application for Patent claims priority to U.S. Provisional Patent Application No. 62/307,419 by Lei et al., entitled "NARROWBAND WIRELESS COMMUNICATIONS CELL SEARCH," filed Mar. 11, 2016, and assigned to the assignee hereof, the entirety of which is expressly incorporated by reference herein for any and all purposes.

BACKGROUND

The following relates generally to wireless communication and more specifically to narrowband wireless communications cell search.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may each be referred to as a user equipment (UE).

In some cases, a UE that is accessing a wireless network may attempt to determine information related to a timing offset, a frequency offset, or an identity of a cell using cell search or cell acquisition procedures. Cell acquisition procedures can be power-intensive relative to other operations a device may perform. That is, for some devices, including devices that operate in a narrowband portion of a larger bandwidth, cell search procedures may use a relatively large amount of the device's limited power supply. This may limit the useful life of the device or interfere with the capacity of the device to perform other useful functions.

SUMMARY

A base station may broadcast a synchronization signal using a narrowband portion of a bandwidth of a cell. The synchronization signal may include a base sequence repeated over several symbol periods using a cover code to support power-efficient cell acquisition. A user equipment (UE) receiving the synchronization signal may determine frequency and timing information for a cell by performing a weighted combination and accumulation of low complexity autocorrelation and cross-correlation procedures on the synchronization signal. The reduced complexity correlation procedures may be enabled based on the use of the cover code. In some cases, the cross-correlation may be performed at multiple sampling rates. The use of the cover code within the synchronization signal may also support correlation procedures that use recursive or repeated updates, which may allow for further reduced computational complexity relative to other cell search procedures.

A method of wireless communication is described. The method may include receiving a synchronization signal using a narrowband portion of a bandwidth of a cell, wherein the synchronization signal comprises a base sequence repeated over a plurality of symbol periods using a cover code, detecting at least one of a frequency offset or a timing offset for the cell based at least in part on the synchronization signal and the cover code, and determining an identity of the cell based at least in part on applying the at least one of the frequency offset or the timing offset.

An apparatus for wireless communication is described. The apparatus may include means for receiving a synchronization signal using a narrowband portion of a bandwidth of a cell, wherein the synchronization signal comprises a base sequence repeated over a plurality of symbol periods using a cover code, means for detecting at least one of a frequency offset or a timing offset for the cell based at least in part on the synchronization signal and the cover code, and means for determining an identity of the cell based at least in part on the frequency offset or the timing offset.

A further apparatus is described. The apparatus may include a processor, memory in electronic communication with the processor, and instructions stored in the memory. The instructions may be operable to cause the processor to receive a synchronization signal using a narrowband portion of a bandwidth of a cell, wherein the synchronization signal comprises a base sequence repeated over a plurality of symbol periods using a cover code, detect at least one of a frequency offset or a timing offset for the cell based at least in part on the synchronization signal and the cover code, and determine an identity of the cell based at least in part on applying the at least one of the frequency offset or the timing offset.

A non-transitory computer readable medium for wireless communication is described. The non-transitory computer-readable medium may include instructions to cause a processor to receive a synchronization signal using a narrowband portion of a bandwidth of a cell, where the synchronization signal comprises a base sequence repeated over a set of symbol periods using a cover code, detect at least one of a frequency offset or a timing offset for the cell based on the synchronization signal and the cover code, and determine an identity of the cell based at least in part on applying the at least one of the frequency offset or the timing offset.

In some examples of the method, apparatus, and non-transitory computer-readable medium described above, the detecting comprises: determining a first timing offset estimate or a first frequency offset estimate using a sliding autocorrelation on the synchronization signal at a first sampling rate. Some examples of the method, apparatus, and non-transitory computer-readable medium described above may further include processes, features, means, or instructions for determining a second timing offset estimate or a second frequency offset estimate using a first cross-correlation on the synchronization signal at the first sampling rate based at least in part on applying the first timing offset estimate or the first frequency offset estimate. Some examples of the method, apparatus, and non-transitory computer-readable medium described above may further include processes, features, means, or instructions for detecting the at least one of the frequency offset or the timing offset using a second cross-correlation on the synchronization signal at a second sampling rate based at least in part on applying the second timing offset estimate or the second frequency offset estimate.

In some examples of the method, apparatus, and non-transitory computer-readable medium described above, the sliding autocorrelation comprises a combination of sliding autocorrelations for multiple lags.

Some examples of the method, apparatus, and non-transitory computer-readable medium described above may further include processes, features, means, or instructions for selecting a function for the combination of sliding autocorrelations for multiple lags from a plurality of combination functions having different computational complexity based at least in part on a metric.

In some examples of the method, apparatus, or non-transitory computer-readable medium described above, at least one of the sliding autocorrelation, the first cross-correlation, or the second cross-correlation may be based at least in part on a recursive update of a correlation parameter of the synchronization signal.

Some examples of the method, apparatus, or non-transitory computer-readable medium described above may further include processes, features, means, or instructions for determining a first value of a plurality of sequence terms based on the cover code, wherein each sequence term of the plurality of sequence terms corresponds to a portion of the synchronization signal received during a symbol period of the plurality of symbol periods. Some examples of the method, apparatus, or non-transitory computer-readable medium described above may further include processes, features, means, or instructions for determining a second value based at least in part on the first value and a reference sequence term, wherein the first cross-correlation or the second cross-correlation may be based at least in part on the second value.

In some examples of the method, apparatus, and non-transitory computer-readable medium described above, an accumulation of the sliding autocorrelation may be based at least in part on a correlation parameter of the received synchronization signal and a correlation parameter of at least one previously received version of the synchronization signal.

Some examples of the method, apparatus, and non-transitory computer-readable medium described above may further include processes, features, means, or instructions for receiving a secondary synchronization signal (SSS) based at least in part on the applying of the at least one of the timing offset or the frequency offset. Some examples of the method, apparatus, and non-transitory computer-readable medium described above may further include processes, features, means, or instructions for determining the identity of the cell based at least in part on receiving the SSS.

In some examples of the method, apparatus, and non-transitory computer-readable medium described above, the determining the identity of the cell further comprises determining a duplexing mode or a cyclic prefix (CP) length. In some examples of the method, apparatus, or non-transitory computer-readable medium described above, the sequence comprises a constant amplitude zero autocorrelation (CAZAC) sequence. In some examples of the method, apparatus, and non-transitory computer-readable medium described above, the cover code comprises a binary cover code. In some examples of the method, apparatus, and non-transitory computer-readable medium described above, the binary cover code comprises an antipodal binary cover code. In some examples of the method, apparatus, and non-transitory computer-readable medium described above, the cover code comprises a polyphase sequence.

A method of wireless communication is described. The method may include generating a synchronization signal that includes a cover code applied to a plurality of versions of a base sequence and transmitting the synchronization signal using a narrowband portion of a bandwidth of a cell over a plurality of symbol periods, wherein each version of the plurality of versions of the base sequence is transmitted using a symbol period of the plurality of symbol periods.

An apparatus for wireless communication is described. The apparatus may include means for generating a synchronization signal that includes a cover code applied to a plurality of versions of a base sequence and means for transmitting the synchronization signal using a narrowband portion of a bandwidth of a cell over a plurality of symbol periods, wherein each version of the plurality of versions of the base sequence is transmitted using a symbol period of the plurality of symbol periods.

A further apparatus is described. The apparatus may include a processor, memory in electronic communication with the processor, and instructions stored in the memory. The instructions may be operable to cause the processor to generate a synchronization signal that includes a cover code applied to a plurality of versions of a base sequence and transmit the synchronization signal using a narrowband portion of a bandwidth of a cell over a plurality of symbol periods, wherein each version of the plurality of versions of the base sequence is transmitted using a symbol period of the plurality of symbol periods.

A non-transitory computer readable medium for wireless communication is described. The non-transitory computer-readable medium may include instructions to cause a processor to generate a synchronization signal that includes a cover code applied to a set of versions of a base sequence and transmit the synchronization signal using a narrowband portion of a bandwidth of a cell over a set of symbol periods, where each version of the set of versions of the base sequence is transmitted using a symbol period of the set of symbol periods.

Some examples of the method, apparatus, or non-transitory computer-readable medium described above may further include processes, features, means, or instructions for transmitting an additional synchronization signal using a central portion of the bandwidth of the cell, where the central portion of the bandwidth is greater than the narrowband portion of the bandwidth.

Some examples of the method, apparatus, or non-transitory computer-readable medium described above may further include processes, features, means, or instructions for transmitting a SSS comprising an indication of a cell identity.

In some examples of the method, apparatus, and non-transitory computer-readable medium described above, the SSS further comprises a duplexing mode or a CP length. In some examples of the method, apparatus, and non-transitory computer-readable medium described above, the cover code comprises a binary cover code. In some examples of the method, apparatus, and non-transitory computer-readable medium described above, the binary cover code comprises an antipodal binary cover code. In some examples of the method, apparatus, and non-transitory computer-readable medium described above, the cover code comprises a polyphase sequence. In some examples of the method, apparatus, and non-transitory computer-readable medium described above, the base sequence comprises a CAZAC sequence.

Some examples of the method, apparatus, and non-transitory computer-readable medium described above may further include processes, features, means, or instructions for transmitting the synchronization signal over a plurality of physical resource blocks (PRBs).

Some examples of the method, apparatus, and non-transitory computer-readable medium described above may further include processes, features, means, or instructions for generating a plurality of synchronization signals, wherein each synchronization signal includes one of a plurality of cover codes applied to a plurality of versions of the base sequence. Some examples of the method, apparatus, and non-transitory computer-readable medium described above may further include processes, features, means, or instructions for transmitting the plurality of synchronization signals over a plurality of physical resource blocks (PRBs).

BRIEF DESCRIPTION OF THE DRAWINGS

FIG. 4 illustrates an example of correlation pattern in a system that supports narrowband wireless communications cell search in accordance with aspects of the present disclosure;

DETAILED DESCRIPTION

A base station may communicate with low cost or low complexity devices, such as machine type communications (MTC) devices, using a narrowband portion of a cell bandwidth. Synchronization signals directed toward these devices may be designed to enable efficient cell search procedures. For example, the synchronization signal may be based on a single sequence repeated using a binary or polyphase cover code.

A cell search procedure for a low complexity device may be initiated by performing a sliding autocorrelation, through which a user equipment (UE) may evaluate a number of time offset hypotheses at a first sampling rate. In some cases, (e.g., if the UE detects a synchronization signal), a timing or frequency hypothesis that corresponds to a peak autocorrelation parameter may be used to generate a coarse timing or frequency offset estimate.

When the sliding autocorrelation generates a timing and frequency offset estimate based on the synchronization signal, a low-complexity cross-correlation procedure may be performed at the first sampling rate to confirm the presence of the synchronization signal. The reduced complexity of the cross-correlation procedure may be based on the properties of the synchronization signal (e.g., the use of the cover code). In some cases, the cross-correlation may be used to reject the coarse timing and frequency offset estimate produced at the sliding autocorrelation stage.

After the first cross-correlation, the UE may use an additional cross-correlation at an increased sampling rate to refine the timing and frequency offset estimate. Then, based on the refined timing and frequency offset estimate, the UE may receive an additional signal (e.g., a secondary synchronization signal (SSS)), which may indicate the identity of the cell. The cell search process may then be repeated (e.g., if the UE performs a search for another cell).

Aspects of the disclosure introduced above are described further in the context of a wireless communication system. Examples of narrowband cell search procedures, synchronization signal design, and correlation patterns are then described. Aspects of the disclosure are further illustrated by and described with reference to apparatus diagrams, system diagrams, and flowcharts that relate to narrowband wireless communications cell search.

Figure 1:
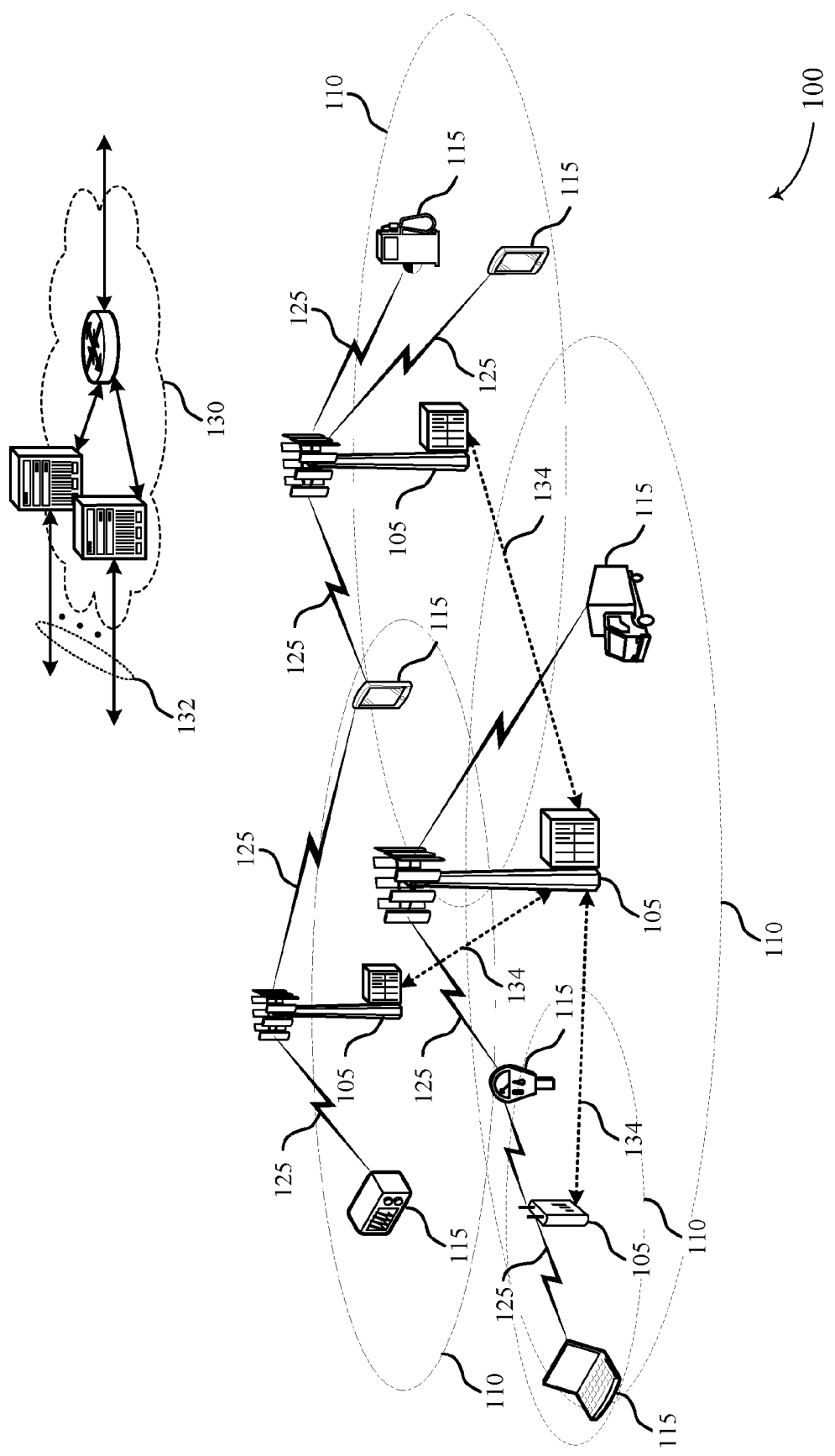
FIG. 1 illustrates an example of a wireless communications system that supports narrowband wireless communications cell search in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network. Wireless communications system 100 may support the use of dedicated narrowband (NB) synchronization signals for low cost or low complexity devices to reduce the power consumption these devices expend during cell search procedures.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, an MTC device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

Some types of wireless devices may provide for automated communication. Automated wireless devices may include those implementing internet-of-things (IoT) communication, Machine-to-Machine (M2M) communication, or MTC. IoT, M2M or MTC may refer to data communication technologies that allow devices to communicate with one another or a base station without human intervention. For example, IoT, M2M or MTC may refer to communications from devices that integrate sensors or meters to measure or capture information and relay that information to a central server or application program that can make use of the information or present the information to humans interacting with the program or application.

Some UEs 115 may be MTC devices, such as those designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. An MTC device may operate using half-duplex (one-way) communications at a reduced peak rate. MTC devices may also be configured to enter a power saving "deep sleep" mode when not engaging in active communications.

A UE 115 attempting to access a wireless network may perform an initial cell search by detecting a primary synchronization signal (PSS) from a base station 105. The PSS may enable synchronization of slot timing and, in some cases, may indicate a physical layer identity value. In other cases, e.g., for a PSS directed toward MTC or internet-of-things (IoT) devices, the PSS may not include identity information. A dedicated MTC or IoT PSS may be structured to minimize the processing power used to perform a synchronization process at a UE 115. The UE 115 may then receive a SSS. The SSS may enable radio frame synchronization, and may provide a cell identity (CID) value, which may be combined with the physical layer identity value to identify the cell. In some cases, the SSS may indicate the CID independently of the PSS (e.g., in the case of a narrowband PSS for MTC or IoT devices). The SSS may also enable detection of a duplexing mode and a CP length. Some systems, such as time division duplexing (TDD) systems, may transmit an SSS but not a PSS.

In some cases, the PSS and the SSS may be located in the central 62 and 72 subcarriers of a carrier, respectively. A narrowband PSS or SSS may utilize a smaller number of tones (e.g., within a single resource block). After receiving the PSS and SSS, the UE 115 may receive a master information block (MIB), which may be transmitted in the physical broadcast channel (PBCH). The MIB may contain system bandwidth information, a system frame number (SFN), and a physical hybrid automatic repeat request (HARM) indicator channel (PHICH) configuration. After decoding the MIB, the UE 115 may receive one or more system information blocks (SIGs). For example, SIB1 may contain cell access parameters and scheduling information for other Ms. Decoding SIB1 may enable the UE 115 to receive SIB2. SIB2 may contain radio resource control (RRC) configuration information related to random access channel (RACH) procedures, paging, physical uplink control channel (PUCCH), physical uplink shared channel (PUSCH), power control, sounding reference signal (SRS), and cell barring.

In some cases, wireless communications system 100 may utilize one or more enhanced component carriers (eCCs). An eCC may be characterized by one or more features including: flexible bandwidth, different transmission time intervals (TTIs), and modified control channel configuration. In some cases, an eCC may be associated with a carrier aggregation (CA) configuration or a dual connectivity configuration (e.g., when multiple serving cells have a suboptimal backhaul link). An eCC may also be configured for use in unlicensed spectrum or shared spectrum (e.g., where more than one operator is licensed to use the spectrum).

An eCC characterized by flexible bandwidth may include one or more segments that may be utilized by UEs 115 that are not capable of monitoring the whole bandwidth or prefer to use a limited bandwidth (e.g., to conserve power). In some cases, an eCC may utilize a different TTI length than other component carriers (CCs), which may include use of a reduced or variable symbol duration as compared with TTIs of the other CCs. The symbol duration may remain the same, in some cases, but each symbol may represent a distinct TTI. In some examples, an eCC may support transmissions using different TTI lengths. For example, some CCs may use uniform lms TTIs, whereas an eCC may use a TTI length of a single symbol, a pair of symbols, or a slot. In some cases, a shorter symbol duration may also be associated with increased subcarrier spacing. In conjunction with the reduced TTI length, an eCC may utilize dynamic TDD operation (e.g., it may switch from DL to UL operation for short bursts according to dynamic conditions.)

Flexible bandwidth and variable TTIs may be associated with a modified control channel configuration (e.g., an eCC may utilize an enhanced physical downlink control channel (ePDCCH) for DL control information). For example, one or more control channels of an eCC may utilize frequency-division multiplexing (FDM) scheduling to accommodate flexible bandwidth use. Other control channel modifications include the use of additional control channels (e.g., for evolved multimedia broadcast multicast service (eMBMS) scheduling, or to indicate the length of variable length UL and DL bursts), or control channels transmitted at different intervals. An eCC may also include modified or additional HARQ related control information.

Thus, a base station 105 may broadcast a synchronization signal using a narrowband portion of a bandwidth of a cell. The synchronization signal may include a base sequence repeated over several symbol periods using a cover code to support power-efficient cell acquisition. A UE 115 receiving the synchronization signal may determine frequency and timing information for a cell by performing a combination of low complexity autocorrelation and cross-correlation procedures on the synchronization signal. The reduced complexity correlation procedures may be enabled based on the use of the cover code. In some cases, the cross-correlation may be performed at multiple sampling rates. The use of the cover code within the synchronization signal may also support correlation procedures that use recursive or repeated updates, which may allow for further reduced computational complexity (e.g., relative to other cell search procedures).

Figure 2:
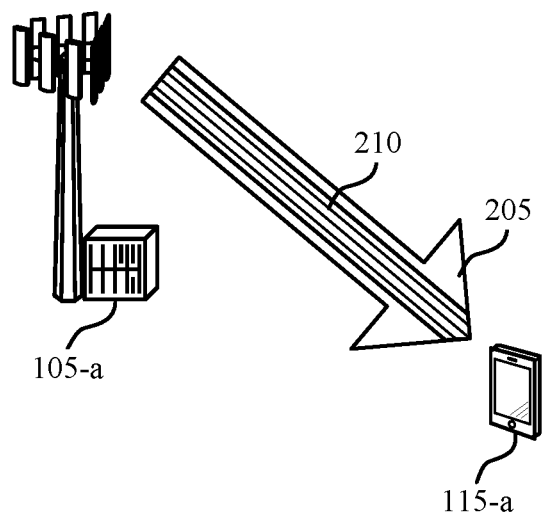
FIG. 2 illustrates an example of a wireless communications system that supports narrowband wireless communications cell search in accordance with aspects of the present disclosure.

FIG. 2 illustrates an example of a wireless communications system 200 for narrowband wireless communications cell search. Wireless communications system 200 may include base station 105-*a* and UE 115-*a*, which may be examples of the corresponding devices described with reference to FIG. 1. Wireless communications system 200 may support the use of dedicated narrowband synchronization signals for low cost or low complexity devices to reduce the power consumption these devices expend during cell search procedures.

Base station 105-a may communicate using cell bandwidth 205. However, UE 115-a may be an MTC device or an IoT device, and may not utilize the total cell bandwidth 205 (e.g., in order to conserve power). Thus, base station 105-a may communicate with UE 115-a using a narrowband portion 210 of the cell bandwidth 205. Narrowband Internet of Things (NB-IoT) operations may enable physical devices to collect and exchange data over narrowband channels. These devices may be embedded with electronics, software, sensors, and/or network connectivity so that they may be wirelessly connected.

Cell searching techniques may attempt to both identify a neighboring cell and synchronize UE 115-a to the neighboring cell. UE 115-a may search for primary synchronization signals and secondary synchronization signals by collecting samples of a frequency channel that the neighboring cell is operating on. PSSs and SSSs may be transmitted by neighboring base stations 105 within a radio frame. In some cases, a neighboring cell may transmit more than one SSS in a radio frame. UE 115-a may detect the more than one SSSs in order to detect the neighboring cell as well as to synchronize itself with the neighboring cell. Furthermore, a sampling rate determines how many samples of a frequency channel UE 115-a collects within a given time frame. For example, a higher sampling rate may correspond to a greater number of samples of a waveform taken during a certain time frame, whereas a lower sampling rate may correspond to a smaller number of samples taken during a certain time frame. Therefore, a lower sampling rate may reduce the memory requirements for low-cost devices.

Antipodal signaling may be used to minimize packet error rate in transmitting synchronization signals. In signal space, antipodal signaling may maximize the Euclidean distance between symbols within the signal. In some cases, a binary cover code may be used to create the antipodal signals. The signal may be coded with the cover code prior to transmission (e.g., at the base station 105-a). That is, base station 105-a may create a synchronization signal by coding multiple base sequences to be transmitted with the cover code. The multiple sequences may each be coded with individual cover code values. At the sequence level, antipodal signaling may randomize the signal pattern and suppress auto-correlation side lobes to increase the accuracy of signal detection and timing acquisition.

Determining the symbol timing (e.g., timing offset) and carrier frequency offset may improve the result of synchronization of orthogonal frequency division multiplexing (OFDM) signals. Incorrect timing may introduce inter-symbol interference (ISI) and inter-carrier interference (ICI), which may reduce system performance. Techniques used to determine the symbol timing and carrier frequency offset may include cross-correlation techniques and auto-correlation techniques. Cross-correlation may measure a similarity of two series as a function of the lag of one relative to the other. Cross-correlation may determine a time delay between two signals. The maximum of the cross-correlation function may indicate the point in time where the signals are best aligned. Autocorrelation may be the cross-correlation of a signal with itself at different points in time. The autocorrelation function may be used to illustrate the similarity between observations as a function of the time lag between them. These techniques may be used to reduce ISI and ICI. However, these techniques may also consume large amounts of processing power and other resources.

A sampling rate, as discussed herein, may be the rate at which an analog or continuous signal is converted to a discrete or digital signal. The term sampling rate may also refer to a clock rate for certain digital signal processing functions. A reduced sampling rate may be a sampling rate that is reduced relative to (e.g., is less than) other sampling rates within a system. In some cases, narrowband UEs may use a sampling rate that is lower than the sampling rate associated with the system bandwidth (e.g., 1.92 MHz sampling rate for a 1.4 MHz subchannel instead of 30.72 MHz for a 20 MHz channel). An even lower sampling rate (e.g., 240 kHz) may be used for the computationally intensive operations required for initial cell search.

Narrowband cell searching may be divided into multiple steps to increase power efficiency. UE 115-a may first detect a signal and implement carrier frequency offset (CFO) correction by using sliding auto-correlation techniques. UE 115-a may then perform coarse synchronization via cross correlation techniques on the signal. Fast recursive timing and frequency offset correction based on refined and localized cross correlation techniques may then be performed on the signal. Lastly, SSS processing techniques may be used to determine the identity of the cell.

The structure of the narrowband PSS (NB-PSS) or narrowband SSS (NB-SSS) may facilitate power-conserving signal processing techniques. For example, each NB-PSS symbol may include a short CAZAC sequence such as a Zadoff-Chu (ZC) sequence (e.g., of length K=11). At the symbol level, this may preserve the good correlation and low peak-to-average power properties of the ZC sequence. In some cases, this structure may be quasi-periodic, where each PSS or SSS symbol may have the same duration. For example, if sampled at 1.92 MHz, each PSS or SSS symbol may have 137 samples, with one sample offset with respect to the first symbol of the second slot for a legacy LTE subframe. In cases with wider bandwidth (e.g., more than 180 kHz), the pattern and size of the code cover, as well as the pattern and length of the base sequences, can be jointly optimized according to the performance requirements of the UE 115, such as acquisition accuracy, latency and complexity.

As an example, an NB-PSS may be created by base station 105-a based on a cover code and a base sequence. A device may first create a base sequence from LTE symbols. The length of the sequence may be based on the number of LTE symbols to be transmitted by the device (e.g., 11 LTE symbols). The base sequence $Z_k$ of a subcarrier may be determined by the equation $$Z_k = \exp\left(\frac{-j5\pi(k+1)}{11}\right), \quad (1)$$
$$k = 0, 1, \ldots, 10$$

The device may subsequently map the sequences to corresponding subcarriers and then transform the sequences using Inverse Fast Fourier Transformation (IFFT). A CP may be inserted before each symbol of the sequence. The sequences may then be coded with the cover code. For example, a size-11 binary cover code that spans over the last 11 OFDM symbols of a LTE subframe may be illustrated as $$S_{\{1:11\}} = [1\,1\,1\,1\,-1\,-1\,1\,1\,1\,1\,-1\,1] \quad (2)$$

At the symbol level, this antipodal signal may maximize the Euclidean distance in signal space. At the sequence level, the antipodal signal may randomize the signal pattern as well as suppress side lobes resulting from partial autocorrelation.

In another example, a size-11 polyphase cover code that spans over the last 11 OFDM symbols of an LTE subframe may be used. Where a binary cover code may refer to a sequence of two values (e.g., phase values), a polyphase cover code refers to a sequence having more than two values (e.g., more than two phase values).

In some cases, subcarrier mapping for NB-PSS or NB-SSS symbols may align with non-NB LTE symbols. For example, the NB subcarrier tones may be located on the first five subcarriers to left of the zeroth subcarrier, the first five subcarriers to the right of the zeroth subcarrier, and on the zeroth subcarrier itself. In some cases, there may be no subcarrier located (e.g., a null tone) at the lower edge and/or the upper edge of the subcarrier index.

The power-efficient cell searcher may allow for efficient implementation of cross-correlation techniques. For example, a one-symbol correlator may be used to obtain cross-correlation with an entire NB-PSS sequence comprising eleven symbols.

Cross-correlation between a received signal r(t) and local reference a(t) for time and frequency offset hypotheses (τ, f) may be provided by:

$$\langle r(t-\tau), a(t)e^{j2\pi ft} \rangle = \sum_{k=n}^{n+10} R_k A_k^H \quad (3)$$

$$= \sum_{k=n}^{n+10} S(k-n)e^{j2\pi f(t-nT)} R'_k A^H \quad (4)$$

$$= \left\{ \sum_{k=n}^{n+10} S(k-n)e^{j2\pi f(t-nT)} R'_k \right\} A^H \quad (5)$$

where r(t) and $R_k$ represent the received signal, a(t) and $A_k^H$ are the local signal, n is the symbol period index and S(n) is the cover code, and $R'_k$ represents the received signal multiplied by the cover code term. In aspects of the present disclosure, since the terms of the cover code may be binary, the multiplication by 1 or −1 may be done prior to summation, which may enable a significant reduction in the number of complex multiplication operations (e.g., on the single operation of multiplication by the reference sequence at the end). Similarly, a polyphase cover code may be optimized in order to enable the reduction in the number of complex multiplication operations.

The power-efficient cell searcher may also utilize recursive updating of timing hypotheses. Recursive updating may allow a UE to update hypotheses without having to recalculate each sequence set. Each hypothesis may have more than one sequence set, where each sequence set may comprise a symbol, a cover code, and a reference signal. Each hypothesis may additionally correspond to an estimated start time τ.

For example, when τ=kT, a sample term may be represented by:

$$S(1)e^{j2\pi f(t-kT-T)}R'_{k+1}$$

A number of sample terms may be combined as described above to generate a correlation value. A subsequent hypothesis may comprise multiple sequence sets from the previous hypothesis. For example, when τ=(k+1)T, a sample term may be represented by:

$$S(0)e^{j2\pi f(t-kT-T)}R'_{k+1}$$

e.g., which may have already been used in generating the hypothesis with τ=kT. Thus, the subsequent hypothesis may adjust the group of terms used by removing (e.g., flushing) a single term, and by generating a single new term. By using multiple previously generated terms from previous hypotheses, a UE 115 may avoid performing additional cross-correlation calculations, thereby saving processing or power resources.

Recursive updating may be implemented at both the symbol level and the sample level. Additionally, recursive computations may be applicable to either low sampling rates (e.g., 240 kHz) or high sampling rates (e.g., 1.92 MHz), or a combination thereof. Furthermore, recursive updating may be performed on a timing basis or a frequency basis.

The power-efficient cell searcher may also utilize recursive updating of frequency hypotheses. As with the timing hypotheses, recursive updating may allow a UE 115 to update frequency hypotheses without having to recalculate each sequence set. Each hypothesis may have more than one sequence set, where each sequence set may comprise a symbol, a cover code, and a reference signal. Each hypothesis may additionally correspond to an estimated frequency offset Δf relative to a central frequency $f_0$.

For example, when $f_1=f_0+\Delta f$, a sample term used in the correlation may be $$S(0)e^{j2\pi f_1(t-kT)}R'_k$$

A subsequent hypothesis may comprise multiple terms from the previous hypothesis, where the previous terms may be multiplied by a variable related to the estimated frequency offset. For example, when $f_2=f_0+2\Delta f$, a sample term may be $$S(0)e^{j2\pi f_2(t-kT)}R'_k$$

e.g., which may have been used in the hypothesis with $f_1=f_0+\Delta f$. The subsequent hypothesis may adjust its group of terms by multiplying each term from the previous hypothesis by one or more variables, where the variables may correspond to the change in Δf between the hypotheses. By using multiple terms from previous hypotheses, a UE 115 may avoid performing additional cross-correlation calculations, thereby saving processing or power resources.

The power-efficient cell searcher may utilize recursive updating in combination with autocorrelation techniques. For example, given N samples of a synchronization signal, the autocorrelation may be updated using a perturbation term. For example, if a set of existing correlation terms is given by:

$$R_l(\tau) \triangleq [Z_{lN+1+\tau} Z_{lN+2+\tau} \ldots Z_{(l+1)N+\tau}] \quad (6)$$

the update based on a perturbation term may be given by:

$$A_k(\tau) \triangleq R_{l+k}(\tau)R_l^H(\tau) \quad (7)$$

$$= \sum_{p=1}^{N} Z_{N(l+k)+p+\tau} Z^*_{Nl+p+\tau}$$

$$= A_k(\tau-1) + \epsilon(\tau)$$

wherein the perturbation term ∈(τ) may be defined by:

$$\epsilon(\tau) = Z_{N(l+k+1)+\tau}Z^*_{N(l+1)+\tau} - Z_{N(l+k)+\tau}Z^*_{Nl+\tau} \quad (8)$$

A sliding autocorrelation may be performed by updating the terms used in generating an average correlation parameter. In some cases, the average may be based on a simple average of individual correlation parameters for a given time period. In other cases a weighted average may be used. For example, if an average based on time periods {0, 1, 2, 3, ... Q} is used, the resulting average for the k-th sliding autocorrelation term may be given by $$\overline{A_k(\tau)} \triangleq \sum_{n=0}^{Q} A_k(\tau + nT), \quad (9)$$

$$k = 1, 2, 3, \ldots, K$$

where k=1 denotes the minimum lag of the sliding autocorrelation, and k=K corresponds to the maximum lag of the sliding autocorrelation.

A combination of the sliding autocorrelations for multiple lags may be updated according to one of the equations below:

$$\rho_m(\tau) \triangleq \overline{A_1(\tau)} \times |\overline{A_1(\tau)}| + \sum_{k=1}^{K-1} w_k \times \overline{A_{k+1}(\tau)} \times (\overline{A_k(\tau)})^* \quad (10)$$

or $$\rho_m(\tau) \triangleq \sum_{k=1}^{K} w_k \times \overline{A_k(\tau)} \times (\overline{A_k(\tau)})^* \quad (11)$$

or $$\rho_m(\tau) \triangleq \sum_{k=1}^{K} w_k \times |\overline{A_k(\tau)}| \quad (12)$$

In some cases, a UE 115 may select one of equations 10, 11, or 12 based on some external metric, measured metric, user preference, or combination of metrics. Examples of measured metrics include a metric of received signal strength or path loss (e.g., a received signal strength indicator (RSSI), a beacon loss rate (BLR), a signal to noise ratio (SNR), a path loss (PL), etc.). Examples of external metrics include an estimated distance from a base station, indication of transmitted signal strength, an indication of channel congestion, and the like. According to some aspects, equation 10 may be associated with a larger number of computations than equations 11 or 12 (e.g., which may consume battery power). Equation 10 may further be associated with a more accurate estimate of the correlation parameter. Accordingly, in some aspects a UE 115 may select equation 10 if the SNR is below a lower threshold, may select equation 11 if the SNR is between two thresholds, or may select equation 12 if the SNR is above an upper threshold.

In some cases, a recursive accumulation across different synchronization periods may be performed, for example according to the equation:

$$\rho_\Sigma(\tau) = \alpha \rho_\Sigma(\tau + nT) + (1-\alpha)\rho_m(\tau) \quad (13)$$

In the preceding equations, $\{w_1, w_2, \ldots w_k\}$ denote the weights for intra-frame combining, and $\{\alpha, 1-\alpha\}$ denote the weights for inter-frame combining. The weights for both intra-frame and inter-frame combining may be jointly optimized to enhance the searcher performance. In some cases, the recursive accumulation across frames may be associated with increased accuracy (e.g., in the case that a significant amount of noise is present or a received signal strength is low).

In aspects of the present disclosure, estimates for a timing offset or a frequency offset may be obtained based on the location (e.g., in time) and value (e.g., amplitude) of the correlation parameter $\rho(\tau)$.

Figure 3:
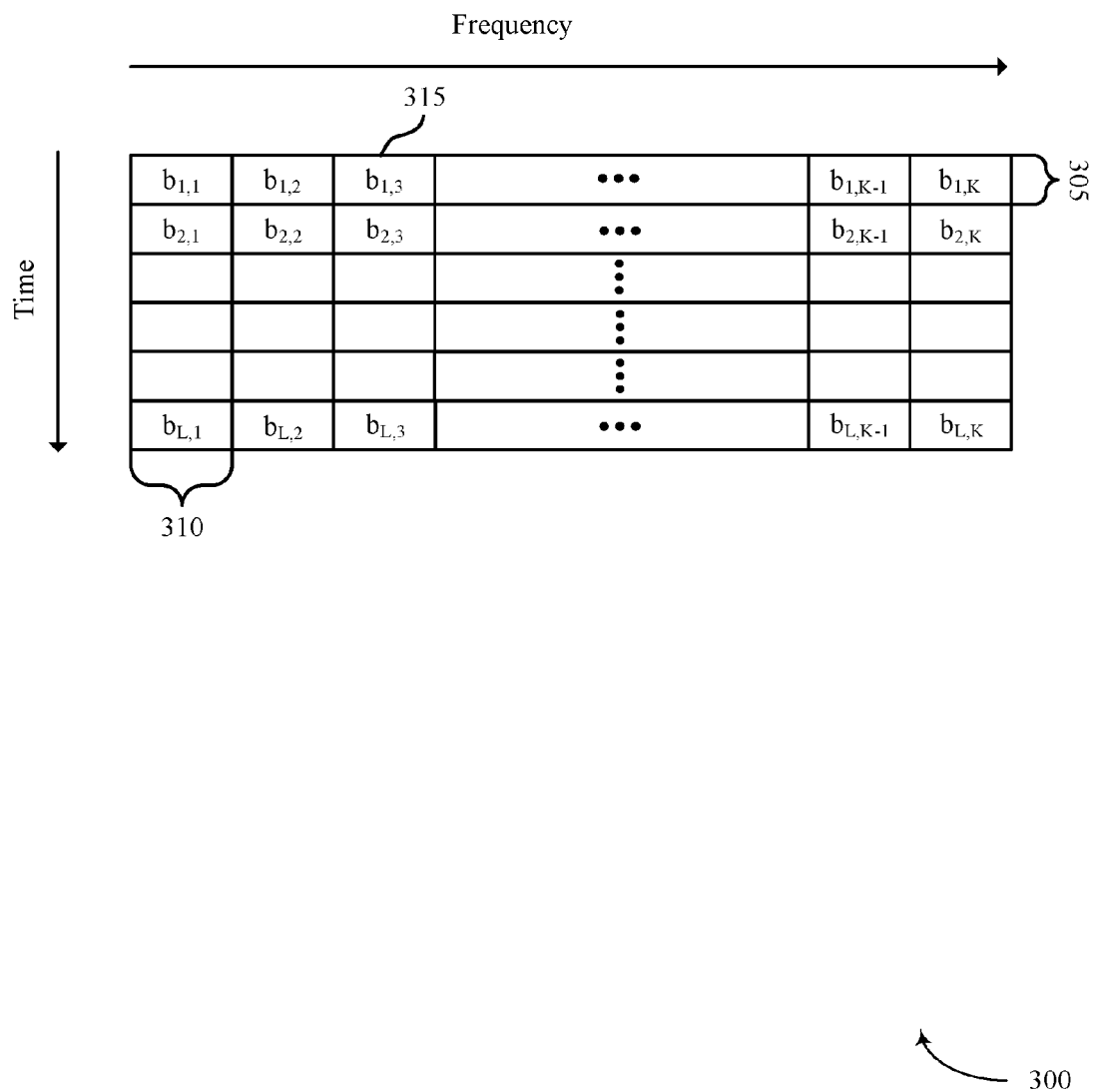
FIG. 3 illustrates an example of a synchronization signal that supports narrowband wireless communications cell search in accordance with aspects of the present disclosure.

FIG. 3 illustrates an example of a synchronization signal 300 for narrowband wireless communications cell search. In some cases, synchronization signal 300 may represent aspects of techniques performed by a UE 115 or base station 105 as described with reference to FIGS. 1-2. In some examples, synchronization signal 300 may represent a PSS or an SSS.

Synchronization signal 300 may represent an example of a synchronization signal that includes a number L of repeated sequences (e.g., rows) that spread over a number L of symbol periods 305. Each sequence may include a number K of complex symbols 315. In some cases, each of the K complex symbols 315 may be mapped to one of a plurality of subcarriers 310 (e.g., there may be K subcarriers 310). In some cases, K=L. Each of the symbol periods 305 may include a full CAZAC sequence (e.g., a Zadoff-Chu sequence). In some examples, following subcarrier mapping, each complex symbol 315 may undergo IFFT and CP insertion. In the present example, following CP insertion, each complex symbol 315 in a symbol period 305 may be encoded with a factor of a cover code used across the L symbol periods 305. As an example, each repetition of the sequence (e.g., each row) may be multiplied by a factor from a cover code. For example, a length 11 Zadoff-Chu sequence may be used with a binary cover code of [1,1,1,1,−1,−1,1, 1,1,−1,1]. In some cases, using an antipodal binary cover code may provide the maximum Euclidean distance between complex symbols 315 in the signal space. It may also enable randomization of the signal pattern and may suppress side lobes for improved autocorrelation of the signal. In this example, each complex symbol 315 in a given symbol period 305 may be associated with one of K different base sequences (e.g., different root indices or different cyclic shifts), which may be mapped to K different subcarriers. Additionally or alternatively, each complex symbol 315 may be distinguished in a given subcarrier 310 using a length L cover code.

FIG. 4 illustrates an example of a correlation pattern 400 for narrowband wireless communications cell search in accordance with various aspects of the present disclosure. Correlation pattern 400 may be performed by UE 115 as described with reference to FIG. 1-2. Correlation pattern 400 may represent an example of a reduced complexity correlation procedure that is enabled by the use of a dedicated narrowband synchronization signal for low cost or low complexity devices. In some cases, correlation pattern 400 may be an example of a cross-correlation procedure or an autocorrelation procedure.

Correlation pattern 400 may represent a comparison of a set of received symbols 410 of a synchronization signal with a reference signal 420 over a number of symbol periods 405. In some cases, the set of received symbols 410 may comprise a synchronization signal (e.g., a PSS). In some cases, the set of received symbols 410 may correspond to the reference signal 420 after application of a cover code 415.

In some cases, the symbol periods 405 occupied by the set of received symbols 410 may follow a number of symbol periods n within a subframe that are not used for transmission of the synchronization signal. In some cases, the symbol periods 405 occupied by the set of received symbols 410 may represent the last symbols in the subframe, such that the number of symbol periods in the subframe equals n plus the number of symbol periods 405 occupied by the set of received symbols 410.

In some cases, the correlation procedure may be a low-complexity cross-correlation based on application of a binary cover code. In the present example, portions of the reference signal 420 over a number of symbol periods 405 may be represented by a reference sequence as A or −A. In this example, the correlation procedure may include combining terms corresponding to the set of received symbols 410 prior to multiplying by the single reference sequence A (as opposed to multiplying each term by a different reference sequence prior to combining the terms). Since multiplication by 1 or −1 are low cost operations, the number of complex multiplication operations may be significantly reduced. Similar reductions in complex multiplication operations may be achieved with the use of a polyphase cover code.

Figure 5:
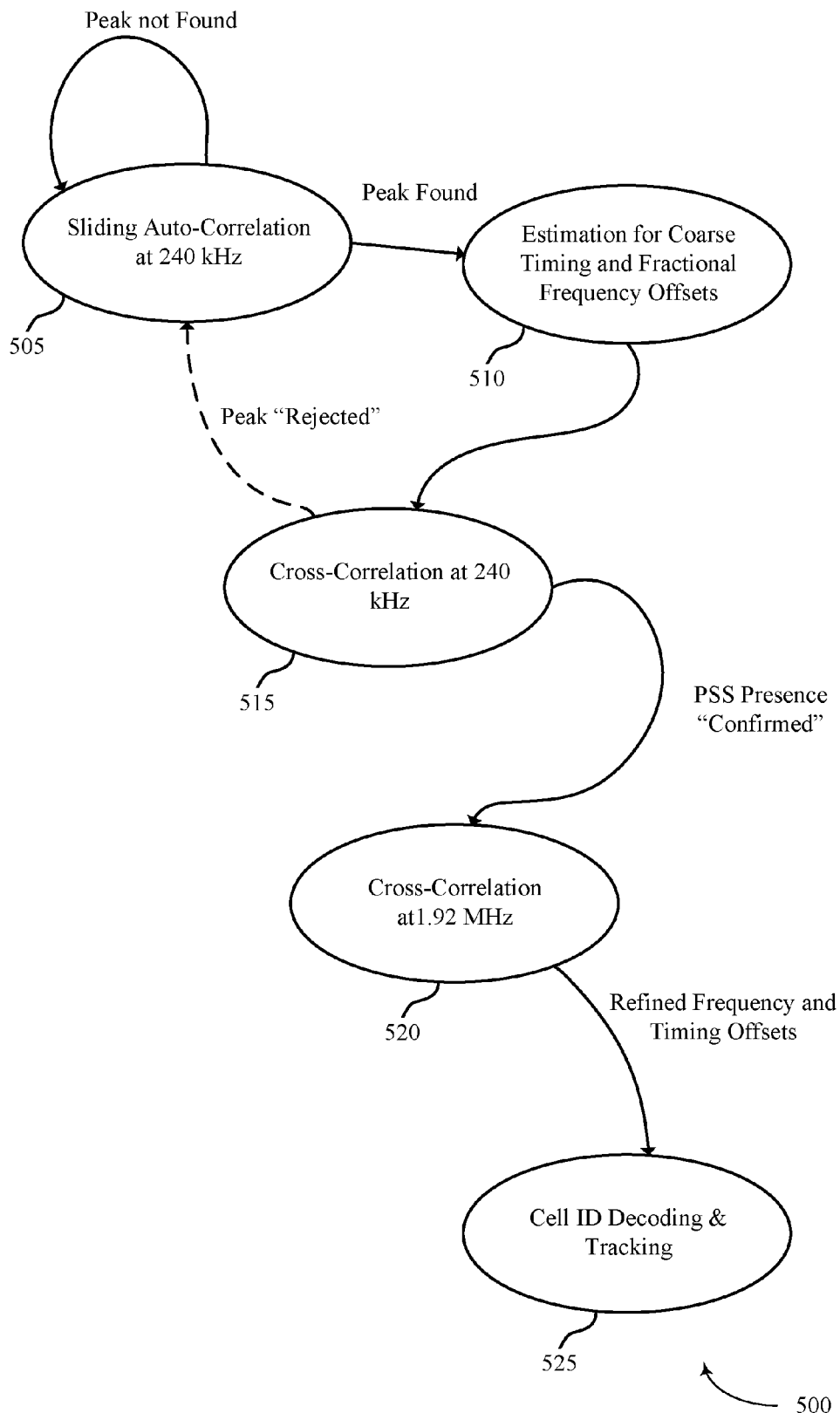
FIG. 5 illustrates an example of a narrowband cell search state diagram that supports narrowband wireless communications cell search in accordance with aspects of the present disclosure.

FIG. 5 illustrates an example of a narrowband cell search diagram 500 for narrowband wireless communications cell search. In some cases, cell search diagram 500 may represent aspects of techniques performed by a UE 115 or base station 105 as described with reference to FIGS. 1-2.

Narrowband cell search diagram 500 represents an example of a narrowband cell search procedure that enables low cost or low complexity devices to identify a cell using a reduced power relative to a cell search procedure for other wireless devices accessing the network.

At the sliding autocorrelation stage 505, a UE 115 may evaluate a number of time or frequency hypotheses at a first sampling rate (e.g., at 240 kHz) using equations 6 through 9. In some cases, (e.g., if the UE 115 detects an autocorrelation peak above a certain threshold), a frequency or timing hypothesis that corresponds to the peak autocorrelation parameter may be used to generate a first frequency or timing offset estimate at estimation stage 510. The autocorrelation parameter may be calculated using at least one of equations 10 through 13, as described above.

At the coarse cross-correlation stage 515, the UE 115 may use a low-complexity cross-correlation procedure at the first sampling rate (e.g., at 240 kHz) to confirm the presence of the synchronization signal (e.g., a PSS). A reduced complexity cross-correlation procedure (e.g., represented by equations 3 through 5) may be used. The reduced complexity of the cross-correlation procedure may be based on the properties of the PSS. For example, the PSS may be a narrowband PSS that is based on repetition of a base sequence over multiple symbol periods using a cover code. In some cases, the coarse cross-correlation stage 515 may also be used to further refine the first timing and frequency offset estimates. In some cases, this may result in a second frequency and timing offset estimate. Alternatively, in some cases, the coarse cross-correlation stage 515 may be used to reject the coarse timing and frequency offset estimates produced at the estimation stage 510 (e.g., if it is a false alarm and no PSS is actually present).

At the fine cross-correlation stage 520, the UE 115 may perform an additional low-complexity cross-correlation procedure (e.g., using equations 3 through 5) to refine the second timing and frequency offset estimates. In some cases, the fine cross-correlation may be performed at a second sampling rate (e.g., at 1.92 MHz). In some cases, the refined second timing and frequency offset estimates may result in detection of a timing or frequency offset.

At cell identification stage 525, the UE 115 may receive an additional signal (e.g., an SSS) based on the timing and frequency offsets. In some cases, the additional signal may indicate the identity of the cell transmitting the PSS and the SSS. The cell search process may then be repeated (e.g., if the UE 115 performs a search for another cell).

Figure 6:
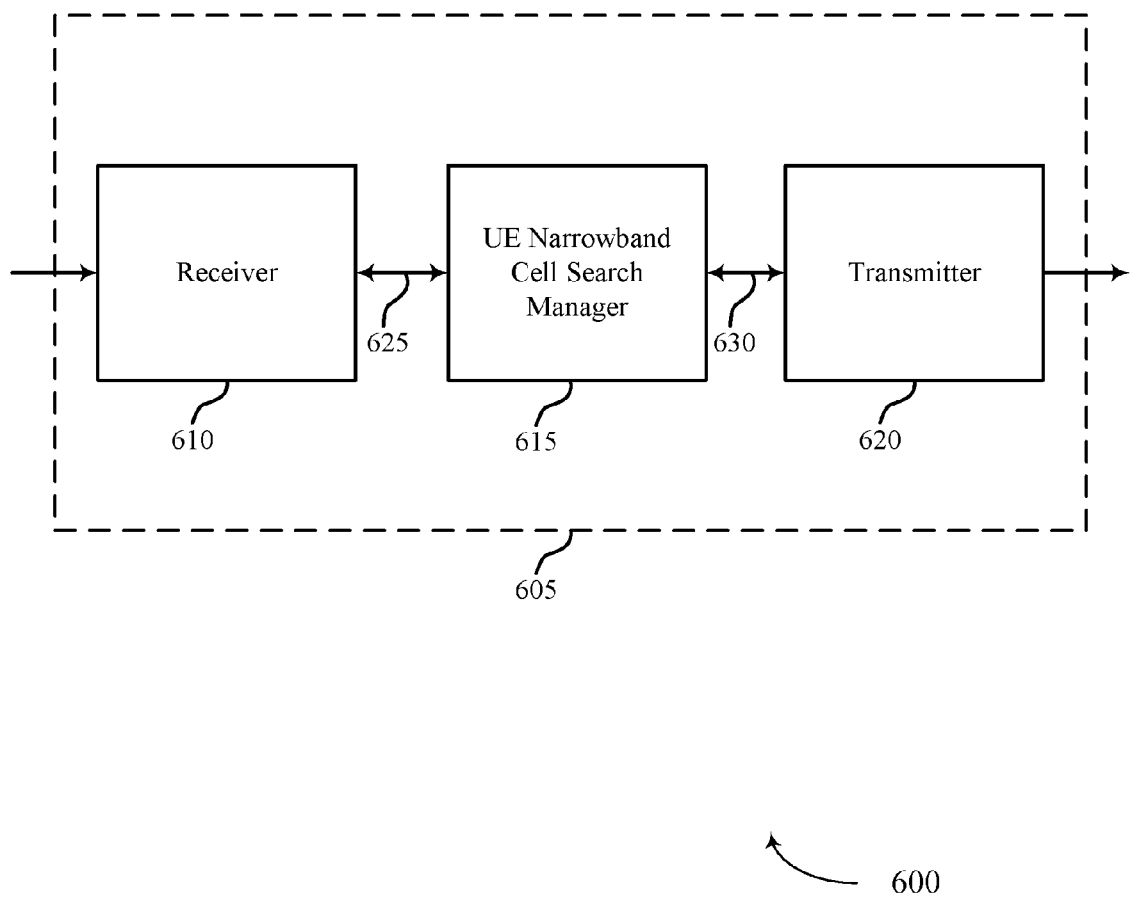
FIGS. 6 through 8 show block diagrams of a wireless device that supports narrowband wireless communications cell search in accordance with aspects of the present disclosure.

FIG. 6 shows a block diagram 600 of a wireless device 605 that supports narrowband wireless communications cell search in accordance with various aspects of the present disclosure. Wireless device 605 may be an example of aspects of a UE 115 described with reference to FIGS. 1 and 2. Wireless device 605 may include receiver 610, UE narrowband cell search manager 615 and transmitter 620. Wireless device 605 may also include a processor. Each of these components may be in communication with each other.

The receiver 610 may receive information such as packets, user data, or control information associated with various information channels (e.g., control channels, data channels, and information related to narrowband wireless communications cell search, etc.). Information may be passed on to other components of the device via link 625. The receiver 610 may be an example of aspects of the transceiver 920 described with reference to FIG. 9.

The UE narrowband cell search manager 615 may receive information via link 625. In some cases, the information may comprise a synchronization signal received using a narrowband portion of a bandwidth of a cell, where the synchronization signal includes a base sequence repeated over a set of symbol periods using a cover code. UE narrowband cell search manager 615 may detect at least one of a frequency offset or a timing offset for the cell based on the synchronization signal and the cover code and determine an identity of the cell based at least in part on applying the frequency offset or the timing offset. The UE narrowband cell search manager 615 may also be an example of aspects of the UE narrowband cell search manager 615-*c* described with reference to FIG. 9.

The transmitter 620 may transmit signals received from other components of wireless device 605 (e.g., via link 630). In some examples, the transmitter 620 may be collocated with a receiver in a transceiver module. For example, the transmitter 620 may be an example of aspects of the transceiver 920 described with reference to FIG. 9. The transmitter 620 may include a single antenna, or it may include a plurality of antennas.

Figure 7:
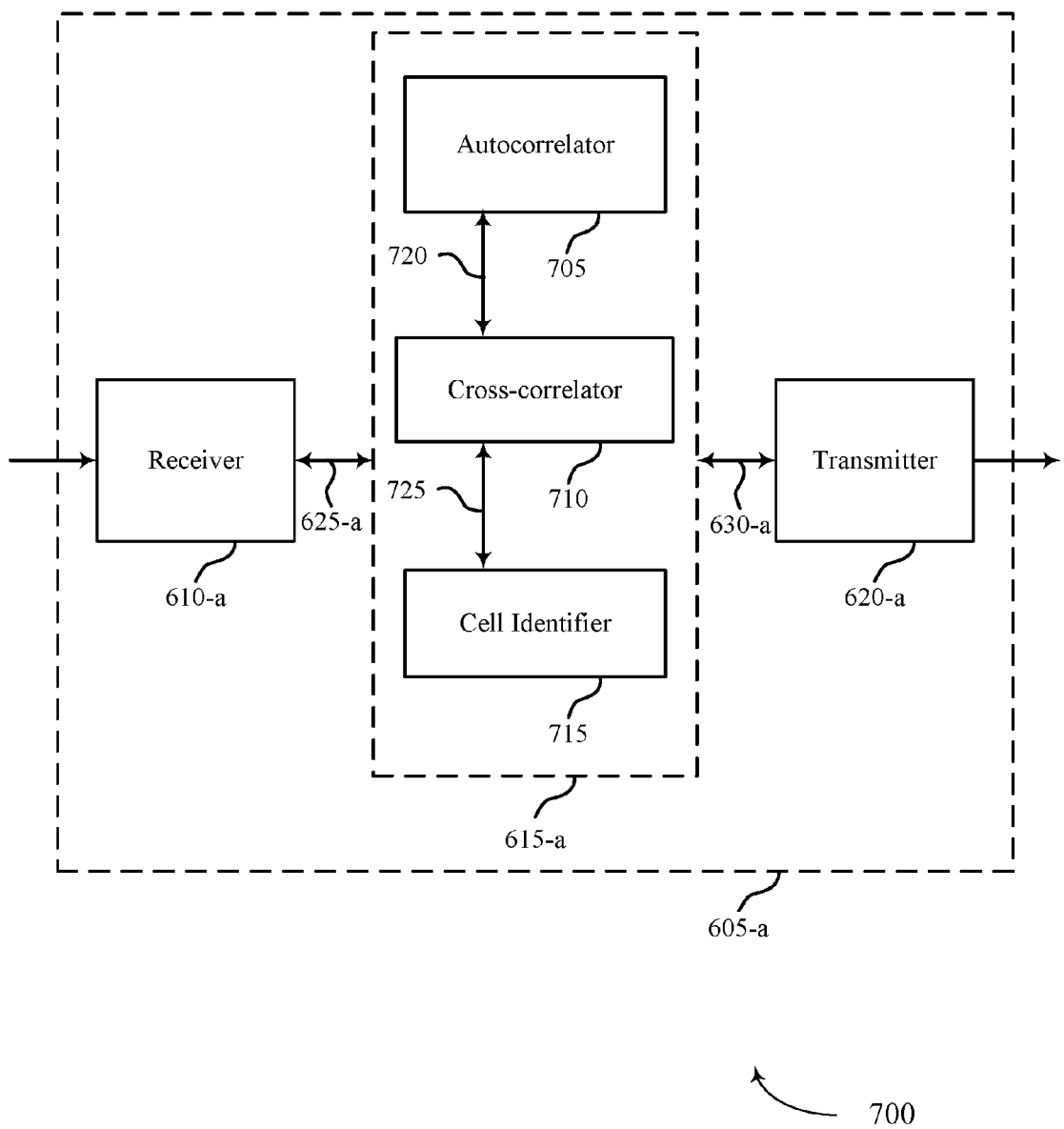

FIG. 7 shows a block diagram 700 of a wireless device 605-*a* that supports narrowband wireless communications cell search in accordance with various aspects of the present disclosure. Wireless device 605-*a* may be an example of aspects of a wireless device 605 or a UE 115 described with reference to FIGS. 1, 2 and 6. Wireless device 605-*a* may include receiver 610-*a*, UE narrowband cell search manager 615-*a* and transmitter 620-*a*. Wireless device 605-*a* may also include a processor. Each of these components may be in communication with each other (e.g., via one of links 625-*a*, 630-*a*, 720, or 725).

The receiver 610-*a* may receive information which may be passed on to other components of the device via link 625-*a*. The receiver 610-*a* may also perform the functions described with reference to the receiver 610 of FIG. 6. The receiver 610-*a* may be an example of aspects of the transceiver 920 described with reference to FIG. 9.

The UE narrowband cell search manager 615-*a* may be an example of aspects of UE narrowband cell search manager 615 described with reference to FIG. 6. The UE narrowband cell search manager 615-*a* may include autocorrelator 705, cross-correlator 710, and cell identifier 715. The UE narrowband cell search manager 615-*a* may be an example of aspects of the UE narrowband cell search manager 615-*c* described with reference to FIG. 9.

The autocorrelator 705 may analyze a synchronization signal received using a narrowband portion of a bandwidth of a cell, where the synchronization signal includes a base sequence repeated over a set of symbol periods using a cover code. In some cases, the base sequence may include a CAZAC sequence (e.g., a Zadoff-Chu sequence). Autocorrelator 705 may determine the similarity between portions of a received signal as a function of the time lag between them. In some cases, autocorrelator 705 may receive portions of the received signal for analysis via link 625-*a*. Autocorrelator 705 may perform equations 6 through 9 and/or equations 10 through 13 above.

The cross-correlator 710 may detect at least one of a frequency offset or a timing offset for the cell based on the synchronization signal and the cover code. In some cases, the frequency or timing offset may be based at least in part on information received from the autocorrelator 705 (e.g., via link 720). Additionally or alternatively, the cross-correlator 710 may receive portions of the received signal for analysis via link 625-*a*. Cross-correlator 710 may perform equations 3 through 5 above.

The cell identifier 715 may identify the cell based on the frequency offset or the timing offset. In aspects of the present disclosure, the cell identifier 715 may rely on information received from the cross-correlator 710 (e.g., via link 725). Additionally or alternatively, the cell identifier 715 may receive portions of the received signal for analysis via link 625-*a*.

The transmitter 620-*a* may transmit signals received from other components of wireless device 605-*a* (e.g., via link 630-*a*). In some examples, the transmitter 620-*a* may be collocated with a receiver in a transceiver module. For example, the transmitter 620-*a* may be an example of aspects of the transceiver 920 described with reference to FIG. 9. The transmitter 620-*a* may utilize a single antenna, or it may utilize a plurality of antennas.

Figure 8:
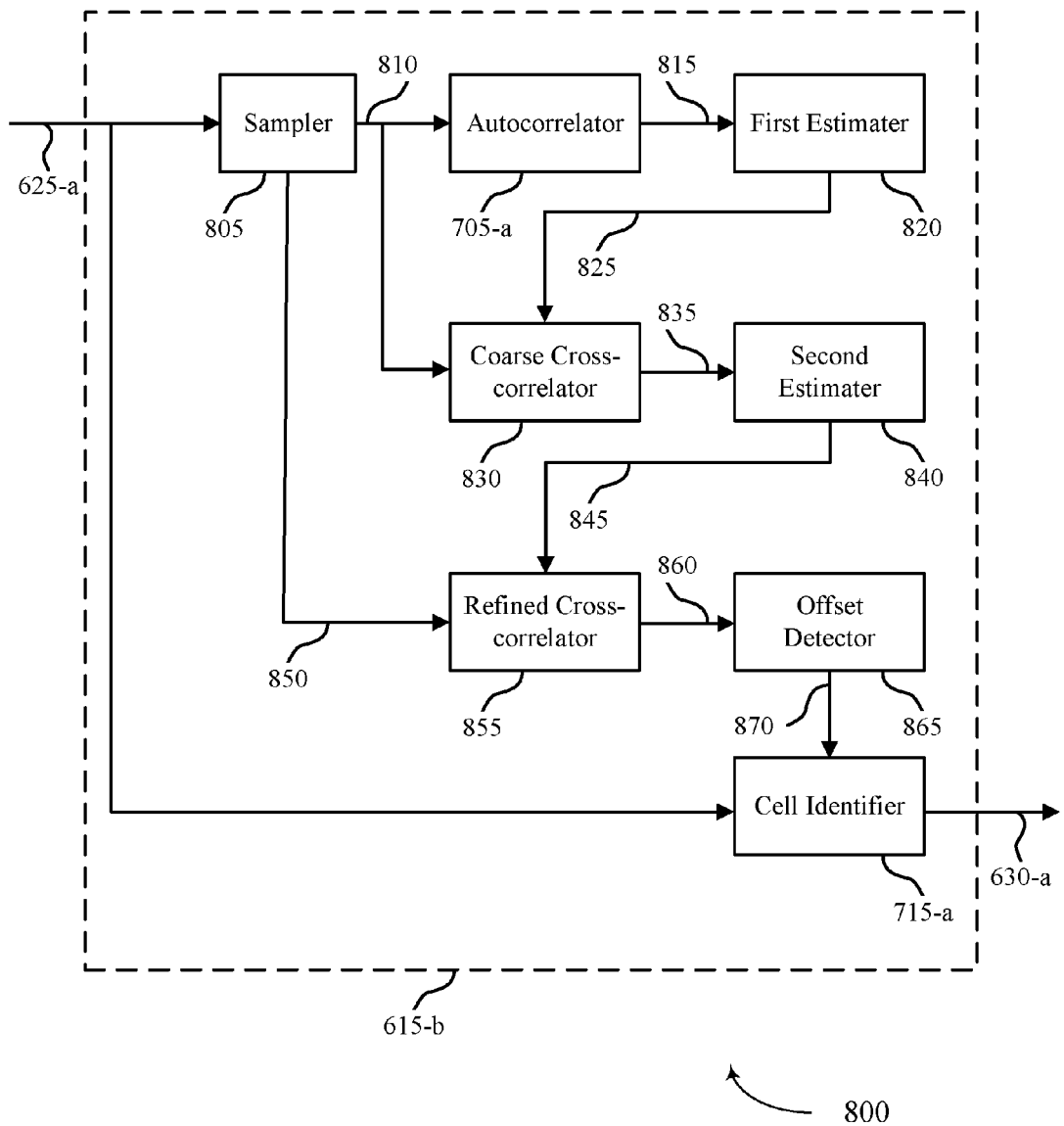

FIG. 8 shows a block diagram 800 of a UE narrowband cell search manager 615-*b*, which may be an example of the corresponding component of wireless device 605 or wireless device 605-*a*. The UE narrowband cell search manager 615-*b* may also be an example of aspects of the UE narrowband cell search manager 615-*c* described with reference to FIG. 9.

The UE narrowband cell search manager 615-*b* may include sampler 805, autocorrelator 705-*a*, first estimater 820, coarse cross-correlator 830, second estimater 840, refined cross-correlator 855, offset detector 865, and cell identifier 715-*a*. Each of these modules may communicate, directly or indirectly, with one another (e.g., via one or more buses or communication links).

The sampler 805 may be an example of an analog-to-digital converter. In aspects of the present disclosure, the sampler may sample a received waveform (e.g., which may be communicated to sampler 805 via link 625-*a*) at a given frequency. As an example, sampler 805 may sample the received waveform at a first frequency (e.g., 240 kHz) and communicate a first sequence of samples 810 to other modules. Sampler 805 may additionally or alternatively sample the received waveform at a second frequency (e.g., 1.92 MHz) and communicate a second sequence of samples 850 to other modules.

Autocorrelator 705-*a* may be an example of the corresponding device described with reference to FIG. 7. In aspects of the present disclosure, autocorrelator 705-*a* may perform a sliding autocorrelation on the first sequence of samples 810. Aspects of the sliding autocorrelation are described herein, with reference to FIG. 2, and specifically equations 6 through 13. In some cases, autocorrelator 705-*a* may determine a correlation parameter 815.

First estimater 820 may determine a first timing or frequency offset estimate 825 based on the correlation parameter 815 received from autocorrelator 705-*a*.

Coarse cross-correlator 830 may perform cross-correlation on the first sequence of samples 810 based at least in part on the first timing and frequency offset estimate 825. Aspects of the coarse cross-correlation are described above with reference to FIG. 2, and specifically equations 3 through 5. In some cases, coarse cross-correlator 830 may confirm or reject the presence of a synchronization signal as described above with reference to FIG. 5. Coarse cross-correlator 830 may communicate a confirmation 835 of a synchronization signal to a second estimater 840.

Second estimater 840 may determine a second timing or frequency offset estimate 845 based at least in part on confirmation 835 received from coarse cross-correlator 830.

Refined cross-correlator 855 may perform cross-correlation on the second sequence of samples 850 based at least in part on the second timing and frequency offset estimate received 845. Aspects of the refined cross correlation are described above with reference to FIG. 2, and specifically with reference to equations 3 through 5.

Offset detector 865 may detect the timing or frequency offset 870 associated with a given synchronization signal. In aspects of the present disclosure, the timing or frequency offsets may be detected based at least in part on the output 860 of the refined cross-correlator 855.

Cell identifier 715-*a* may be an example of the corresponding device described with reference to FIG. 7. In aspects of the present disclosure, cell identifier 715-*a* may determine one or more parameters of the given cell (e.g., a cell identity, duplexing mode, CP length, etc.) based at least in part on applying a frequency and timing offset 870 to a received waveform 625-*a*. These parameters may be communicated to other modules associated with the UE 115, e.g., via link 630-*a*.

Figure 9:
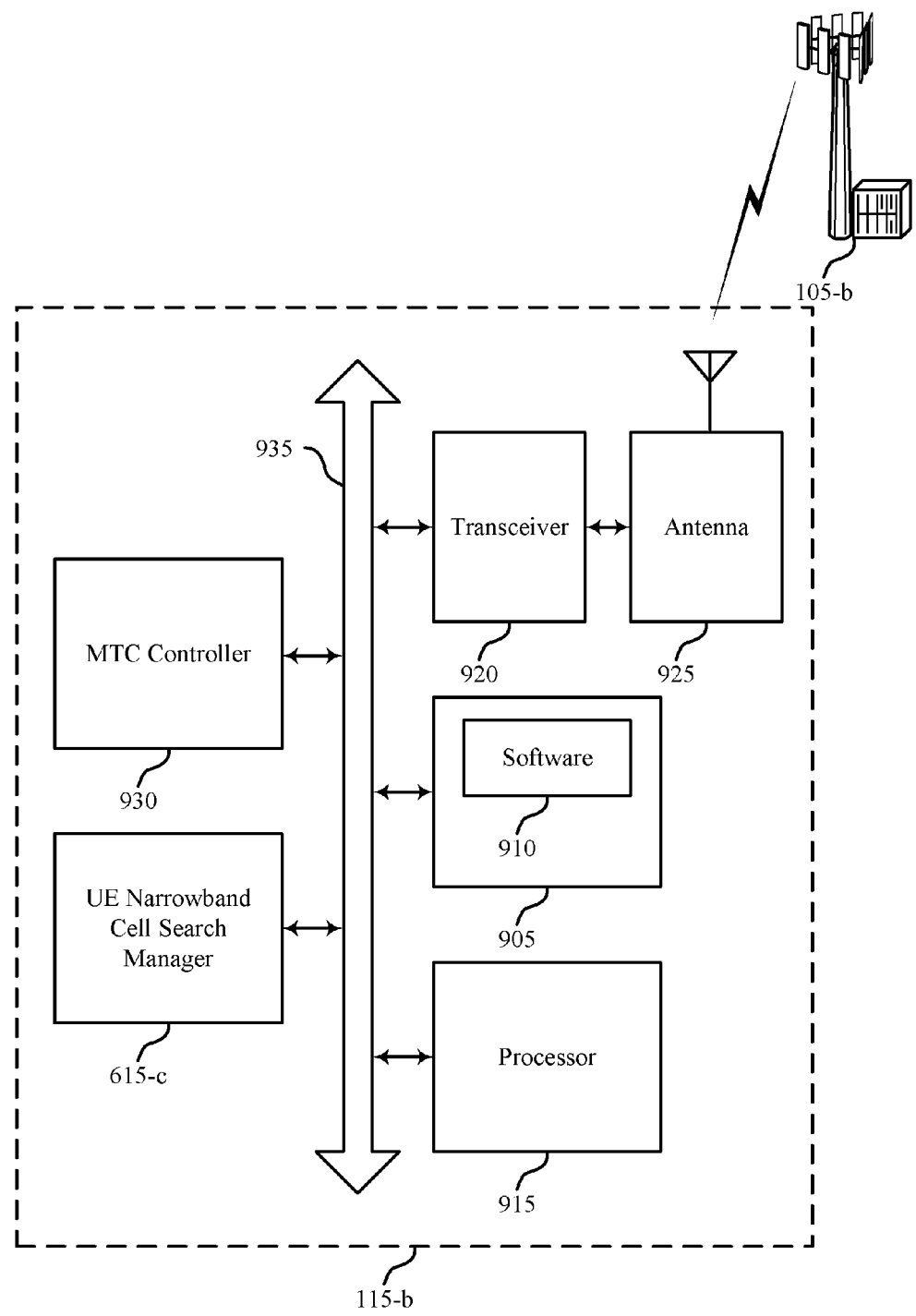
FIG. 9 illustrates a block diagram of a system including a UE that supports narrowband wireless communications cell search in accordance with aspects of the present disclosure.

FIG. 9 shows a diagram of a system 900 including a device that supports narrowband wireless communications cell search in accordance with various aspects of the present disclosure. For example, system 900 may include UE 115-*b*, which may be an example of a wireless device 605-*a*, a wireless device 605-*b*, or a UE 115 as described with reference to FIGS. 1, 2, 6, and 7.

UE 115-*b* may also include UE narrowband cell search manager 615-*c*, memory 905, processor 915, transceiver 920, antenna 925 and MTC Controller 930. Each of these modules may communicate, directly or indirectly, with one another (e.g., via one or more buses 935). The UE narrowband cell search manager 615-*c* may be an example of a UE narrowband cell search manager as described with reference to FIGS. 6 through 8.

The memory 905 may include random access memory (RAM) and read only memory (ROM). The memory 905 may store computer-readable, computer-executable software including instructions that, when executed, cause the processor to perform various functions described herein (e.g., narrowband wireless communications cell search, etc.). In some cases, the software 910 may not be directly executable by the processor but may cause a computer (e.g., when compiled and executed) to perform functions described herein. The processor 915 may include an intelligent hardware device, (e.g., a central processing unit (CPU), a microcontroller, an application specific integrated circuit (ASIC), etc.)

The transceiver 920 may communicate bi-directionally, via one or more antennas, wired, or wireless links, with one or more networks, as described above. For example, the transceiver 920 may communicate bi-directionally with a base station 105 or a UE 115. The transceiver 920 may also include a modem to modulate the packets and provide the modulated packets to the antennas for transmission, and to demodulate packets received from the antennas. In some cases, the wireless device may include a single antenna 925. However, in some cases the device may have more than one antenna 925, which may be capable of concurrently transmitting or receiving multiple wireless transmissions.

MTC Controller 930 may enable MTC or IoT operations such as communication using a narrowband portion of a bandwidth of a cell.

Figure 10:
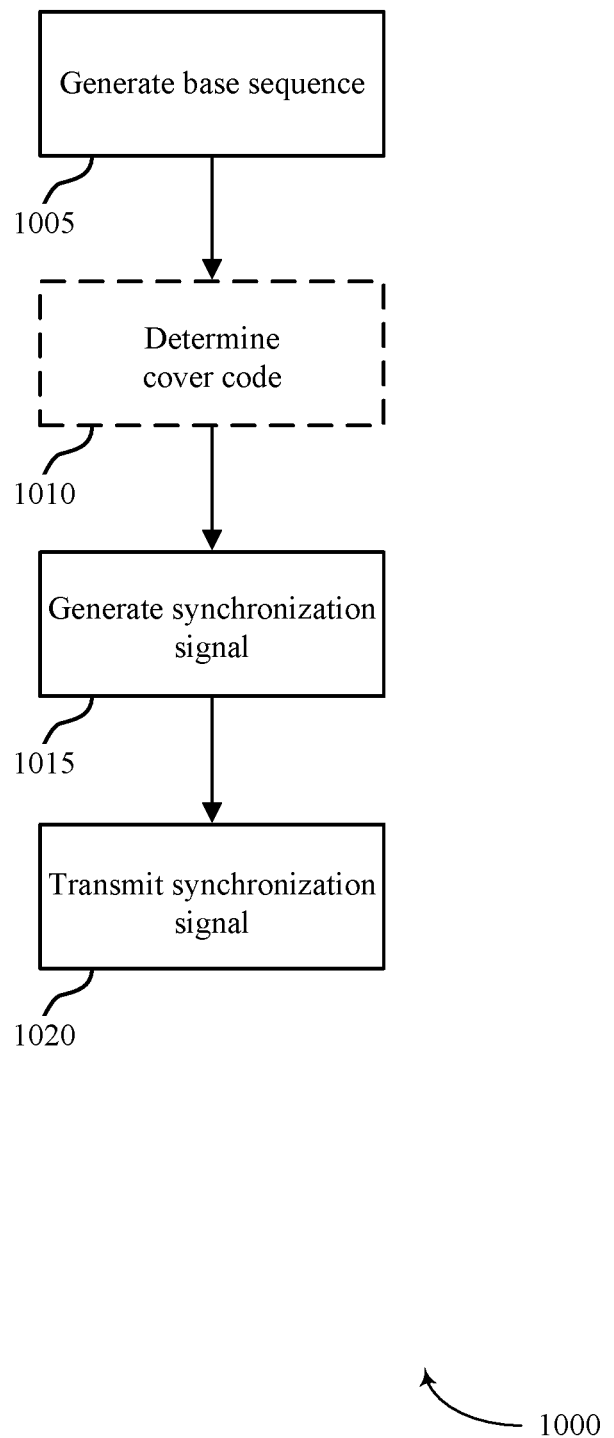
FIG. 10 illustrates an example of a narrowband synchronization signal generation diagram that supports narrowband wireless communications cell search in accordance with aspects of the present disclosure.

FIG. 10 illustrates an example of a narrowband synchronization signal generation diagram 1000 that supports narrowband wireless communications cell search in accordance with aspects of the present disclosure. The operations of diagram 1000 may be implemented by a device such as a base station 105 or its components as described with reference to FIGS. 1 and 2. For example, the operations of diagram 1000 may be performed by the base station narrowband cell search manager as described herein. In some examples, the base station 105 may execute a set of codes to control the functional elements of the device to perform the functions described below. Additionally or alternatively, the base station 105 may perform aspects the functions described below using special-purpose hardware.

At block 1005, the base station 105 may generate one or more base sequences in accordance with aspects of the present disclosure (e.g., using equation 1). In some cases, each base sequence may be based on one or more versions of a CAZAC sequence (e.g., a Zadoff-Chu sequence).

At block 1010, the base station 105 may optionally determine which of a plurality of cover codes to apply to the base sequence generated at block 1005. Examples of cover codes include a binary cover code (e.g., equation 2), an antipodal binary cover code, and a polyphase sequence.

At block 1015, the base station 105 may generate one or more synchronization signals. In some examples, each synchronization signal may include a cover code applied to a set of versions of the base sequence as described above with reference to FIGS. 2 through 5. In certain examples, the operations of block 1015 may be performed by the synchronization signal generator as described with reference to FIGS. 12 and 13.

At block 1020, the base station 105 may transmit one or more synchronization signals (e.g., some combination of a PSS, an SSS, or an alternate synchronization signal). As an example, a PSS may be transmitted using a narrowband portion of a bandwidth of a cell over a set of symbol periods, where each version of the set of versions of the base sequence is transmitted using a symbol period of the plurality of symbol periods as described above with reference to FIGS. 2 through 5. Additionally or alternatively, an SSS may be transmitted over a narrowband portion of the bandwidth of the cell. In some cases, the SSS may include some combination of an indication of a cell identity, a duplexing mode, or a CP length. In some embodiments, the base station 105 may transmit an alternate synchronization signal over a central portion of the bandwidth of the cell, where the central portion of the bandwidth is greater than the narrowband portion. In certain examples, the operations of block 1020 may be performed by the narrowband signal manager as described with reference to FIGS. 12 and 13.

Figure 11:
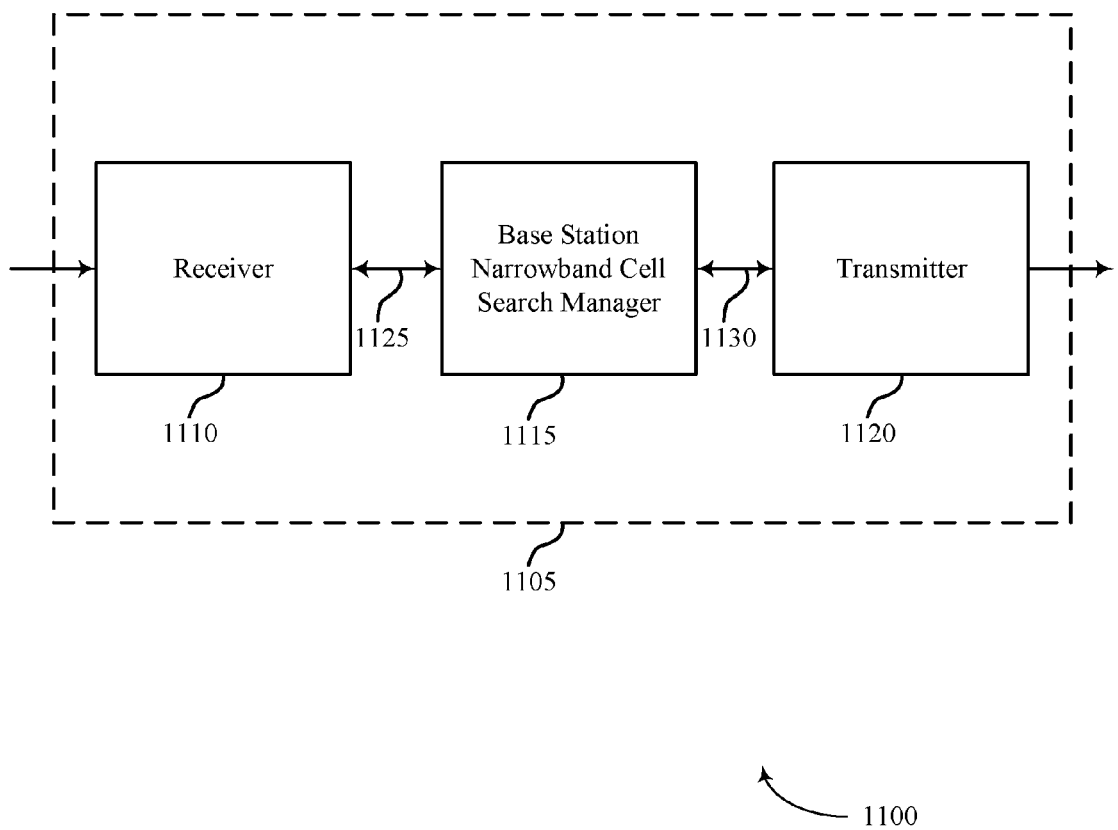
FIGS. 11 through 13 show block diagrams of a wireless device that supports narrowband wireless communications cell search in accordance with aspects of the present disclosure.

FIG. 11 shows a block diagram 1100 of a wireless device 1105 that supports narrowband wireless communications cell search in accordance with various aspects of the present disclosure. Wireless device 1105 may be an example of aspects of a base station 105 described with reference to FIGS. 1 and 2. Wireless device 1105 may include receiver 1110, base station narrowband cell search manager 1115, and transmitter 1120. Wireless device 1105 may also include a processor. Each of these components may be in communication with each other.

The receiver 1110 may receive information such as packets, user data, or control information associated with various information channels (e.g., control channels, data channels, and information related to narrowband wireless communications cell search, etc.). Information may be passed on to other components of the device (e.g., via link 1125). The receiver 1110 may be an example of aspects of the transceiver 1420 described with reference to FIG. 14.

The base station narrowband cell search manager 1115 may generate a synchronization signal that includes a cover code applied to a set of versions of a base sequence, and transmit the synchronization signal using a narrowband portion of a bandwidth of a cell over a set of symbol periods, where each version of the set of versions of the base sequence is transmitted using a symbol period of the set of symbol periods. The base station narrowband cell search manager 1115 may also be an example of aspects of the base station narrowband cell search manager 1115-c described with reference to FIG. 14.

The transmitter 1120 may transmit signals received from other components of wireless device 1105 (e.g., via link 1130). In some examples, the transmitter 1120 may be collocated with a receiver in a transceiver module. For example, the transmitter 1120 may be an example of aspects of the transceiver 1420 described with reference to FIG. 14. The transmitter 1120 may include a single antenna, or it may include a plurality of antennas.

Figure 12:
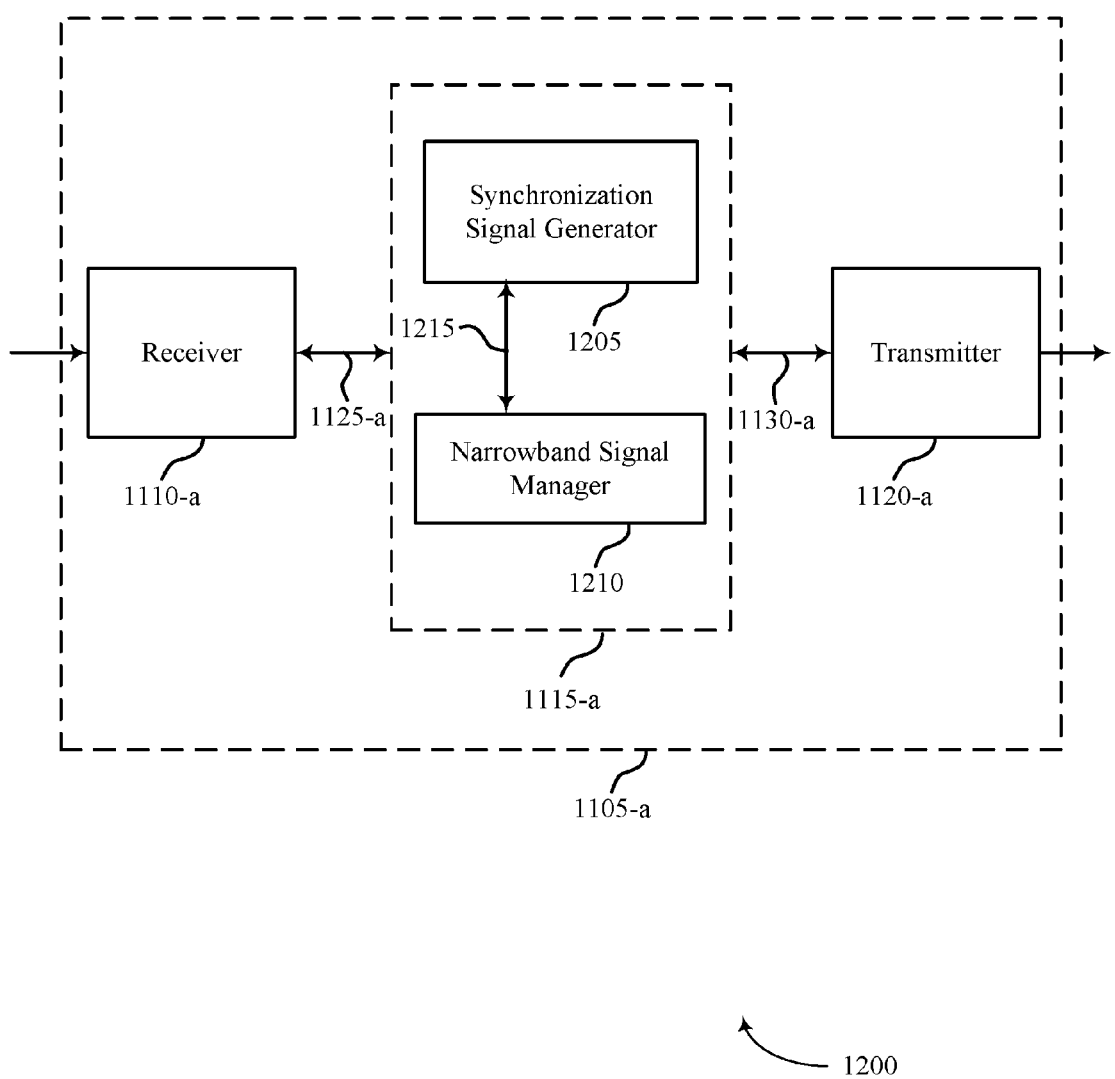

FIG. 12 shows a block diagram 1200 of a wireless device 1105-a that supports narrowband wireless communications cell search in accordance with various aspects of the present disclosure. Wireless device 1105-a may be an example of aspects of a wireless device 1105 or a base station 105 described with reference to FIGS. 1, 2 and 11. Wireless device 1105-a may include receiver 1110-a, base station narrowband cell search manager 1115-a and transmitter 1120-a. Wireless device 1105-a may also include a processor. Each of these components may be in communication with each other (e.g. via links 1125-a, 1130-a, and 1215).

The receiver 1110-a may receive information which may be passed on to other components of the device (e.g., via link 11255-a). The receiver 1110-a may also perform the functions described with reference to the receiver 1110 of FIG. 11. The receiver 1110-a may be an example of aspects of the transceiver 1420 described with reference to FIG. 14.

The base station narrowband cell search manager 1115-a may be an example of aspects of base station narrowband cell search manager 1115 described with reference to FIG. 11. The base station narrowband cell search manager 1115-a may include synchronization signal generator 1205 and narrowband signal manager 1210. The base station narrowband cell search manager 1115-a may be an example of aspects of the base station narrowband cell search manager 1115-c described with reference to FIG. 14.

The synchronization signal generator 1205 may generate a synchronization signal that includes a cover code applied to a plurality of versions of a base sequence. In some cases, the cover code may include a binary or polyphase sequence. In some cases, the base sequence may include a CAZAC sequence such as a Zadoff-Chu sequence.

The narrowband signal manager 1210 may map the synchronization signal (e.g., to subcarriers or symbol periods as described above with reference to FIG. 3). In some cases, the synchronization signal may be communicated to the narrowband signal manager 1210 via link 1215.

The transmitter 1120-*a* may transmit signals received from other components of wireless device 1105-*a* (e.g., via link 1130-*a*). In some examples, transmitter 1120-*a* may transmit the synchronization signal using a narrowband portion of a bandwidth of a cell over a set of symbol periods, where each version of the plurality of versions of the sequence is transmitted using a symbol period of the plurality of symbol periods. In some examples, the transmitter 1120-*a* may be collocated with a receiver in a transceiver module. For example, the transmitter 1120-*a* may be an example of aspects of the transceiver 1420 described with reference to FIG. 14. The transmitter 1120-*a* may utilize a single antenna, or it may utilize a plurality of antennas.

Figure 13:
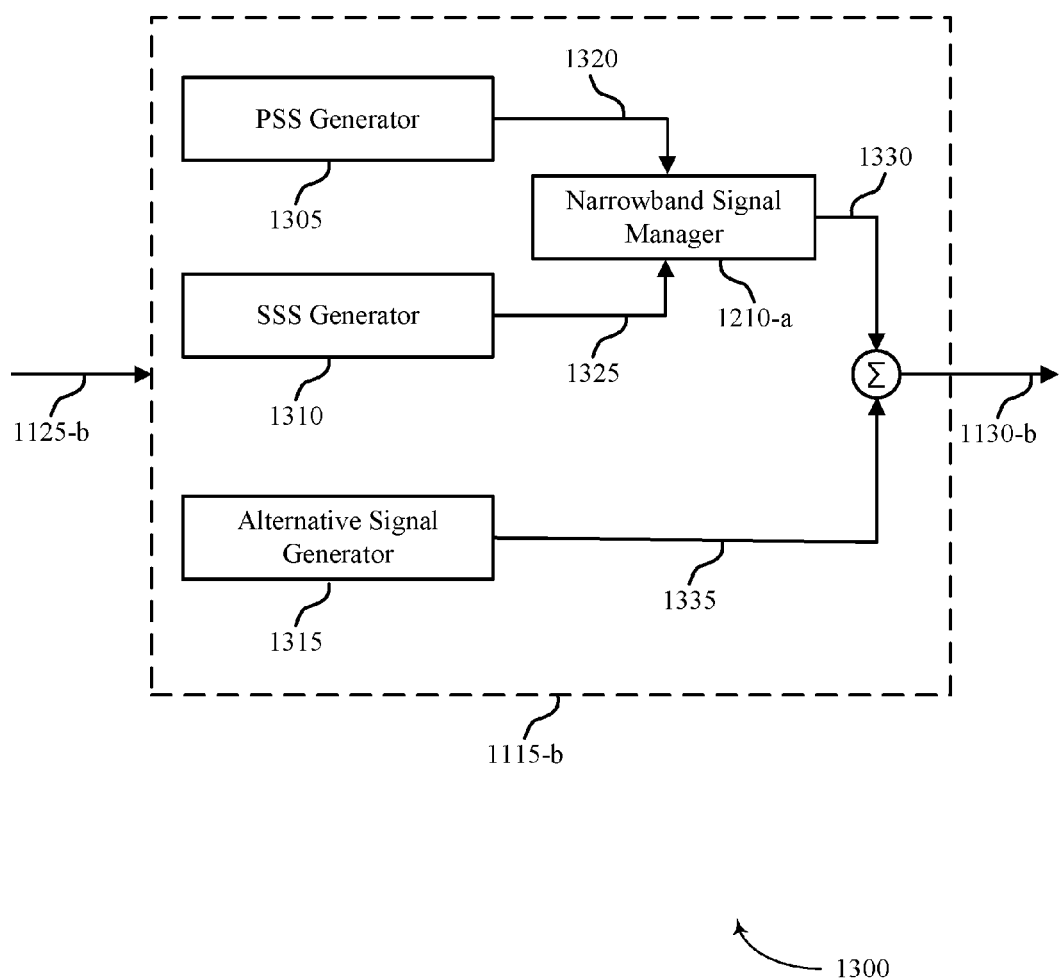

FIG. 13 shows a block diagram 1300 of a base station narrowband cell search manager 1115-*b*, which may be an example of the corresponding component of wireless device 1105 or wireless device 1105-*a* with reference to FIGS. 11 and 12. The base station narrowband cell search manager 1115-*b* may also be an example of aspects of the base station narrowband cell search manager 1115-*c* described with reference to FIG. 13.

The base station narrowband cell search manager 1115-*b* may include PSS generator 1305, SSS generator 1310, alternative signal generator 1315, narrowband signal manager 1210-*a*, or some combination thereof. Each of these modules may communicate, directly or indirectly, with one another (e.g., via one or more buses). Narrowband cell search manager 1115-*b* may receive information via link 1125-*b* (e.g., from a receiver).

PSS generator 1305 may generate a first synchronization signal 1320 (e.g., a PSS) that includes a cover code applied to a plurality of versions of a base sequence. In some cases, the base sequence may be a CAZAC sequence. Examples of the cover code include a binary cover code, an antipodal binary cover code, or a polyphase sequence.

SSS generator 1310 may generate a second synchronization signal 1325 (e.g., an SSS), which includes an indication of a cell identity. Second synchronization signal 1325 may include a cover code applied to a plurality of versions of a base sequence. In some cases, the SSS may additionally include a duplexing mode or a CP length.

First and second synchronization signals 1320 and 1325, respectively, may be communicated to narrowband signal manager 1210-*a* (e.g., they may be communicated at different times). In aspects of the present disclosure, narrowband signal manager 1210-*a* may map the synchronization signals (e.g., to subcarriers or symbol periods), as described above.

Alternative signal generator 1315 may generate one or more additional synchronization signals 1335. In aspects of the present disclosure, these additional synchronization signals 1335 may be transmitted using a wider portion of the bandwidth than the narrowband synchronization signals.

Narrowband cell search manager 1115-*b* may provide information via link 1130-*b* (e.g., to a transmitter). In some cases, the information provided via link 1130-*b* may represent a combination of the outputs of the alternative signal generator 1315 and the narrowband signal manager 1210-*a*, where the outputs are provided by links 1335 and 1330, respectively.

Figure 14:
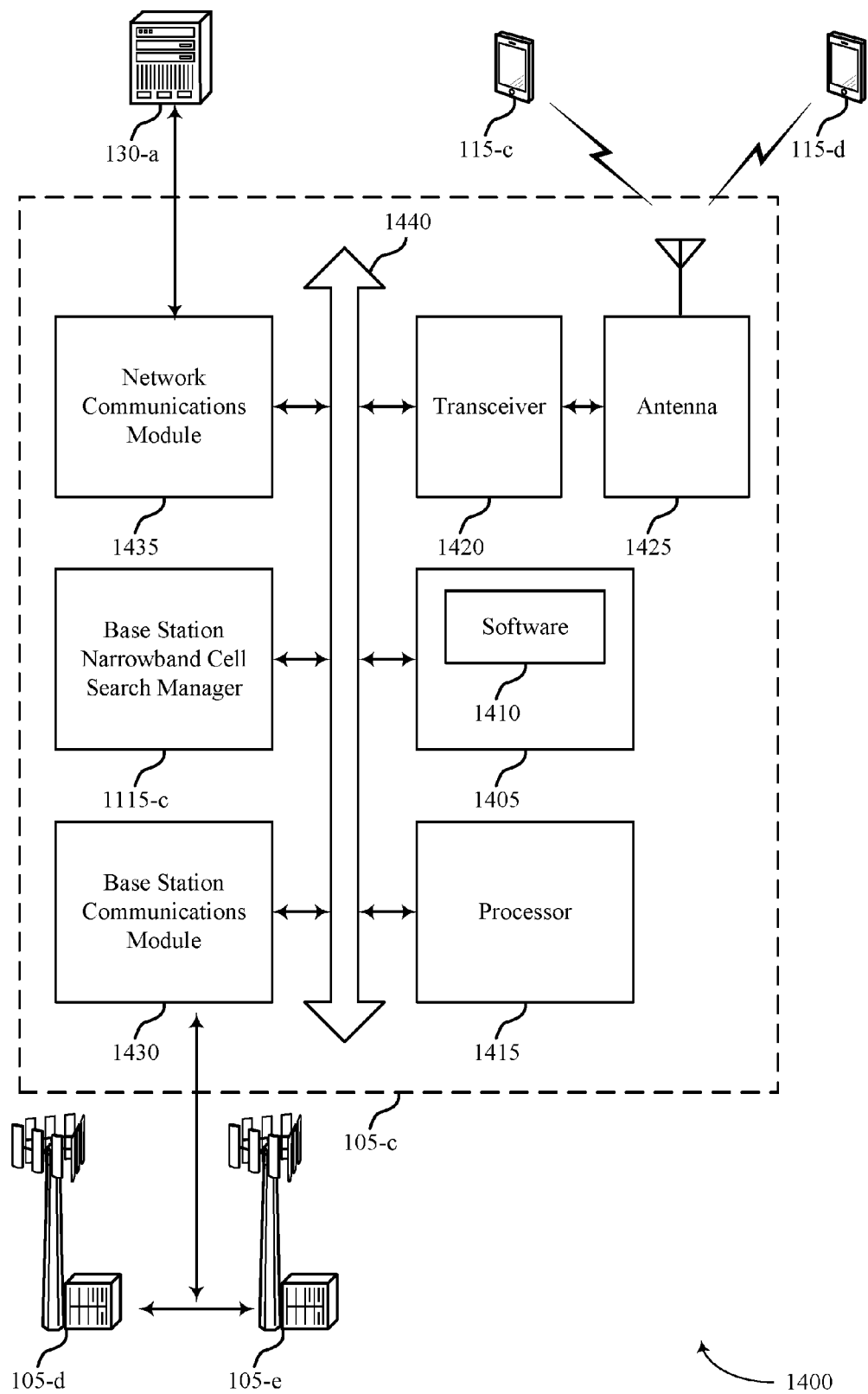
FIG. 14 illustrates a block diagram of a system including a base station that supports narrowband wireless communications cell search in accordance with aspects of the present disclosure.

FIG. 14 shows a diagram of a wireless system 1400 including a device configured that supports narrowband wireless communications cell search in accordance with various aspects of the present disclosure. For example, system 1400 may include base station 105-*c*, which may be an example of a wireless device 1105, a wireless device 1105-*a*, or a base station 105 as described with reference to FIGS. 1, 2, 11, and 12. Base station 105-*c* may also include components for bi-directional voice and data communications including components for transmitting communications and components for receiving communications. For example, base station 105-*c* may communicate bi-directionally with one or more UEs 115.

Base station 105-*c* may also include base station narrowband cell search manager 1115-*c*, memory 1405, processor 1415, transceiver 1420, antenna 1425, base station communications module 1430, and network communications module 1435. Each of these modules may communicate, directly or indirectly, with one another (e.g., via one or more buses or links 1440). The base station narrowband cell search manager 1115-*c* may be an example of a base station narrowband cell search manager as described with reference to FIGS. 11 through 13.

The memory 1405 may include RAM and ROM. The memory 1405 may store computer-readable, computer-executable software including instructions that, when executed, cause the processor to perform various functions described herein (e.g., narrowband wireless communications cell search, etc.). In some cases, the software 1410 may not be directly executable by the processor but may cause a computer (e.g., when compiled and executed) to perform functions described herein. The processor 1415 may include an intelligent hardware device, (e.g., a CPU, a microcontroller, an ASIC, etc.)

The transceiver 1420 may communicate bi-directionally, via one or more antennas, wired, or wireless links, with one or more networks, as described above. For example, the transceiver 1420 may communicate bi-directionally with a base station 105 or a UE 115. The transceiver 1420 may also include a modem to modulate the packets and provide the modulated packets to the antennas for transmission, and to demodulate packets received from the antennas. In some cases, the wireless device may include a single antenna 1425. However, in some cases the device may have more than one antenna 1425, which may be capable of concurrently transmitting or receiving multiple wireless transmissions.

The base station communications module 1430 may manage communications with other base station 105, and may include a controller or scheduler for controlling communications with UEs 115 in cooperation with other base stations 105. For example, the base station communications module 1430 may coordinate scheduling for transmissions to UEs 115 for various interference mitigation techniques such as beamforming or joint transmission. In some examples, base station communications module 1430 may provide an X2 interface within an LTE/LTE-A wireless communication network technology to provide communication between base stations 105.

The network communications module 1435 may manage communications with the core network (e.g., via one or more wired backhaul links). For example, the network communications module 1435 may manage the transfer of data communications for client devices, such as one or more UEs 115.

It should be noted that the methods described herein describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for narrowband wireless communications cell search.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile communications (GSM). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or TDD operation (e.g., using unpaired spectrum resources). Frame structures may be defined for FDD (e.g., frame structure type 1) and TDD (e.g., frame structure type 2).

Thus, aspects of the disclosure may provide for narrowband wireless communications cell search. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method of wireless communication comprising:
    receiving a synchronization signal using a narrowband portion of a bandwidth of a cell, wherein the synchronization signal comprises a base sequence repeated over a plurality of symbol periods using a cover code;
    detecting at least one of a frequency offset or a timing offset for the cell based at least in part on the synchronization signal and the cover code; and
    determining an identity of the cell based at least in part on applying the at least one of the frequency offset or the timing offset.

2. The method of claim 1, wherein the detecting comprises:
    determining a first timing offset estimate or a first frequency offset estimate using a sliding autocorrelation on the synchronization signal at a first sampling rate;
    determining a second timing offset estimate or a second frequency offset estimate using a first cross-correlation on the synchronization signal at the first sampling rate based at least in part on applying the first timing offset estimate or the first frequency offset estimate; and
    detecting the at least one of the frequency offset or the timing offset using a second cross-correlation on the synchronization signal at a second sampling rate based at least in part on applying the second timing offset estimate or the second frequency offset estimate.

3. The method of claim 2, wherein the sliding autocorrelation comprises a combination of sliding autocorrelations for multiple lags.

4. The method of claim 3, further comprising:
    selecting, based at least in part on a metric, a function for the combination of sliding autocorrelations for multiple lags from a plurality of combination functions.

5. The method of claim 2, wherein at least one of the sliding autocorrelation, the first cross-correlation, or the second cross-correlation is based at least in part on an update of a correlation parameter of the synchronization signal.

6. The method of claim 2, further comprising:
    determining a first value of a plurality of sequence terms based at least in part on the cover code, wherein each sequence term of the plurality of sequence terms corresponds to a portion of the synchronization signal received during a symbol period of the plurality of symbol periods; and
    determining a second value based at least in part on the first value and a reference sequence term, wherein the first cross-correlation or the second cross-correlation is based at least in part on the second value.

7. The method of claim 2, wherein an accumulation of the sliding autocorrelation is based at least in part on a correlation parameter of the synchronization signal and a correlation parameter of at least one previously received version of the synchronization signal.

8. The method of claim 1, further comprising:
determining the identity of the cell based at least in part on a secondary synchronization signal (SSS), wherein the SSS is identified in a received signal based at least in part on the applying of the at least one of the timing offset or the frequency offset.

9. The method of claim 1, wherein the determining the identity of the cell further comprises determining a duplexing mode or a cyclic prefix (CP) length.

10. The method of claim 1, wherein the base sequence comprises a constant amplitude zero autocorrelation (CA-ZAC) sequence.

11. The method of claim 1, wherein the cover code comprises a binary cover code.

12. The method of claim 11, wherein the binary cover code comprises an antipodal binary cover code.

13. The method of claim 1, wherein the cover code comprises a polyphase sequence.

14. A method of wireless communication comprising:
generating a synchronization signal that includes a cover code applied to a plurality of versions of a base sequence; and
transmitting the synchronization signal using a narrowband portion of a bandwidth of a cell over a plurality of symbol periods, wherein each version of the plurality of versions of the base sequence is transmitted using a symbol period of the plurality of symbol periods.

15. The method of claim 14, further comprising:
transmitting a second synchronization signal using a central portion of the bandwidth of the cell, wherein the central portion of the bandwidth is greater than the narrowband portion of the bandwidth.

16. The method of claim 14, further comprising:
transmitting a secondary synchronization signal (SSS) comprising at least one of an indication of an identity of the cell, a duplexing mode, or a cyclic prefix (CP) length.

17. The method of claim 14, wherein the cover code comprises a binary cover code.

18. The method of claim 17, wherein the binary cover code comprises an antipodal binary cover code.

19. The method of claim 14, wherein the cover code comprises a polyphase sequence.

20. The method of claim 14, wherein the base sequence comprises a constant amplitude zero autocorrelation (CA-ZAC) sequence.

21. The method of claim 14, further comprising:
transmitting the synchronization signal over a plurality of physical resource blocks (PRBs).

22. The method of claim 14, further comprising:
generating a plurality of synchronization signals, wherein each synchronization signal includes one of a plurality of cover codes applied to a plurality of versions of the base sequence; and
transmitting the plurality of synchronization signals over a plurality of physical resource blocks (PRBs).

23. An apparatus for wireless communication, comprising:
a processor;
memory in electronic communication with the processor; and
instructions stored in the memory and operable, when executed by the processor, to cause the apparatus to:
receive a synchronization signal using a narrowband portion of a bandwidth of a cell, wherein the synchronization signal comprises a base sequence repeated over a plurality of symbol periods using a cover code;
detect at least one of a frequency offset or a timing offset for the cell based at least in part on the synchronization signal and the cover code; and
determine an identity of the cell based at least in part on applying the at least one of the frequency offset or the timing offset.

24. The apparatus of claim 23, wherein the instructions are operable to cause the apparatus to:
determine a first timing offset estimate or a first frequency offset estimate using a sliding autocorrelation on the synchronization signal at a first sampling rate;
determine a second timing offset estimate or a second frequency offset estimate using a first cross-correlation on the synchronization signal at the first sampling rate based at least in part on applying the first timing offset estimate or the first frequency offset estimate; and
detect the at least one of the frequency offset or the timing offset using a second cross-correlation on the synchronization signal at a second sampling rate based at least in part on applying the second timing offset estimate or the second frequency offset estimate.

25. The apparatus of claim 24, wherein at least one of the sliding autocorrelation, the first cross-correlation, or the second cross-correlation is based at least in part on a recursive update of a correlation parameter of the synchronization signal.

26. The apparatus of claim 24, wherein the instructions are operable to cause the apparatus to:
determine a first value of a plurality of sequence terms based at least in part on the cover code, wherein each sequence term of the plurality of sequence terms corresponds to a portion of the synchronization signal received during a symbol period of the plurality of symbol periods; and
determine a second value based at least in part on the first value and a reference sequence term, wherein the first cross-correlation or the second cross-correlation is based at least in part on the second value.

27. The apparatus of claim 23, wherein the instructions are operable to cause the apparatus to:
determine the identity of the cell based at least in part on a secondary synchronization signal (SSS), wherein the SSS is identified in a received signal based at least in part on the applying of the at least one of the timing offset or the frequency offset.

28. An apparatus for wireless communication, comprising:
a processor;
memory in electronic communication with the processor; and
instructions stored in the memory and operable, when executed by the processor, to cause the apparatus to:
generate a synchronization signal that includes a cover code applied to a plurality of versions of a base sequence; and
transmit the synchronization signal using a narrowband portion of a bandwidth of a cell over a plurality of symbol periods, wherein each version of the plurality of versions of the base sequence is transmitted using a symbol period of the plurality of symbol periods.

29. The apparatus of claim 28, wherein the instructions are operable to cause the apparatus to:

transmit an additional synchronization signal using a central portion of the bandwidth of the cell, wherein the central portion of the bandwidth is greater than the narrowband portion of the bandwidth.

30. The apparatus of claim 28, wherein the instructions are operable to cause the apparatus to:

transmit a secondary synchronization signal (SSS) comprising an indication of a cell identity.

* * * * *